(12) United States Patent
Stubbs

(10) Patent No.: US 11,284,496 B2
(45) Date of Patent: **\*Mar. 22, 2022**

(54) LIGHT CONTROL DEVICES AND LIGHT CONTROL SYSTEMS

(71) Applicant: Luminook Lighting, LLC, Lawrence, KS (US)

(72) Inventor: Christopher F. Stubbs, Lawrence, KS (US)

(73) Assignee: Luminook Lighting, LLC, Lawrence, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/177,104

(22) Filed: Feb. 16, 2021

(65) Prior Publication Data
US 2021/0267036 A1 Aug. 26, 2021

Related U.S. Application Data

(63) Continuation of application No. 17/074,158, filed on Oct. 19, 2020, now Pat. No. 10,952,303, which is a (Continued)

(51) Int. Cl.
*H05B 47/13* (2020.01)
*H05B 45/10* (2020.01)
(Continued)

(52) U.S. Cl.
CPC ............... *H05B 47/13* (2020.01); *F21S 9/02* (2013.01); *F21V 23/0471* (2013.01); *H05B 45/10* (2020.01); *F21S 8/031* (2013.01); *F21V 21/0808* (2013.01); *F21Y 2103/10* (2016.08); *F21Y 2115/10* (2016.08)

(58) Field of Classification Search
None
See application file for complete search history.

(56) References Cited

U.S. PATENT DOCUMENTS

| 4,719,363 A | 1/1988 | Gallacher |
| 5,391,088 A | 2/1995 | Tomchak et al. |

(Continued)

OTHER PUBLICATIONS

Korean Intellectual Property Office, international Search Report and Written Opinion of the International Searching Authority, dated Jun. 18, 2021, in PCT/US2021/19691 which is the international application which shares the same priority as this U.S. application.

*Primary Examiner* — Dedei K Hammond
(74) *Attorney, Agent, or Firm* — Kolitch Romano LLP

(57) ABSTRACT

A light control system comprises a light control device and a sensor module configured to detect a motion pattern of a user's hand relative to the entranceway and a light control device. The light control device includes a housing, a proximity sensor configured to detect a position of a door in a vicinity of the entranceway, and a light controller disposed in the housing and communicated with the sensor module and the proximity sensor. The light controller is configured to control the light strip in response to a detected position of the door by the proximity sensor; and control the light strip in response to the motion pattern detected by the sensor module when the door is not detected at a preset opening position or no door is present at the entranceway.

19 Claims, 14 Drawing Sheets

Related U.S. Application Data continuation of application No. 16/876,741, filed on May 18, 2020, now Pat. No. 10,813,196.

(60) Provisional application No. 62/981,742, filed on Feb. 26, 2020, provisional application No. 62/981,778, filed on Feb. 26, 2020, provisional application No. 62/981,816, filed on Feb. 26, 2020.

(51) Int. Cl.
*F21V 23/04* (2006.01)
*F21S 9/02* (2006.01)
*F21Y 115/10* (2016.01)
*F21S 8/00* (2006.01)
*F21V 21/08* (2006.01)
*F21Y 103/10* (2016.01)

(56) References Cited

U.S. PATENT DOCUMENTS

| | | |
|---|---|---|
| 6,023,224 A | 2/2000 | Meyvis |
| 6,912,429 B1 | 6/2005 | Bilger |
| 7,045,764 B2 | 5/2006 | Beggs |
| 7,411,174 B2 | 8/2008 | Eash |
| 9,836,936 B1 | 12/2017 | Brown et al. |
| 10,435,936 B2 | 10/2019 | Lietz et al. |
| 10,785,852 B1* | 9/2020 | Stubbs .................. H05B 47/115 |
| 10,813,196 B1* | 10/2020 | Stubbs ...................... F21S 9/02 |
| 10,952,303 B1* | 3/2021 | Stubbs ................... H05B 47/11 |
| 2006/0011111 A1 | 1/2006 | Stoddard |
| 2006/0086888 A1 | 4/2006 | Eash |
| 2006/0176697 A1 | 8/2006 | Arruda |
| 2010/0296298 A1 | 11/2010 | Martin, Jr. |
| 2013/0009785 A1 | 1/2013 | Finn |
| 2014/0334139 A1* | 11/2014 | Smith ....................... F21S 9/02 362/191 |
| 2015/0163867 A1 | 6/2015 | Recker |
| 2015/0285489 A1* | 10/2015 | Ulysse .................. F21V 33/006 362/183 |
| 2016/0019736 A1 | 1/2016 | Radicella et al. |
| 2016/0290617 A1* | 10/2016 | Nguyen ..................... F21L 4/06 |
| 2017/0122507 A1 | 5/2017 | Hoffman |
| 2017/0223254 A1 | 8/2017 | Brinkman |
| 2018/0306966 A1 | 10/2018 | Conrad |
| 2019/0254136 A1 | 8/2019 | Brinkman |
| 2019/0346095 A1 | 11/2019 | Brown |

* cited by examiner

LIGHT CONTROL DEVICES AND LIGHT CONTROL SYSTEMS

CROSS-REFERENCES

The following applications and materials are incorporated herein, in their entireties, for all purposes: U.S. Non-Provisional patent application Ser. No. 16/876,741, filed May 18, 2020 and entitled "Light Control Devices and Light Control Systems;" U.S. Provisional Patent Application No. 62/981,778, filed Feb. 26, 2020 and entitled "Battery-operated LED controller and multiple sections of LED strip light specifically designed for automatic illumination of a cabinet when the door opens;" U.S. Provisional Patent Application No. 62/981,816, filed Feb. 26, 2020 and entitled "Smarthome hub/bridge, which allows low-power devices using radios other than WiFi to be controlled by an existing smarthome ecosystem, that doubles as a battery pack charger;" and U.S. Provisional Patent Application No. 62/981,742, filed Feb. 26, 2020 and entitled "Battery-operated LED controller and multiple sections of LED strip light specifically designed for automatic illumination of a cabinet when the door opens."

FIELD

This disclosure relates to devices and systems for light control. More specifically, the disclosed embodiments relate to light control devices and light control systems to control a light strip in response to detection of an object or a motion of an object in a vicinity of an entranceway of a room.

INTRODUCTION

Automatic light control is desired and already available to some extent. However, there are some problems with current automatic light control systems using a motion detector. For example, a light control system can turn off while a user is still present in a room but does not move enough. In other cases, the light stays on for a certain time period (or even indefinitely) after the user closes the door to a room, which results in wasted energy. A light control system with an automatic door jamb switch may solve some of the above issues. However, the automatic door jamb switch is typically installed by a qualified electrician when the home is built. Therefore, there exists a need for a light control system enabling desired automatic control and allowing easy installation and retrofitting in an existing space.

SUMMARY

The present disclosure provides systems, apparatuses, and methods relating to control the light strip.

According to one aspect, a light control system for a light strip may include: an LED light strip configured to extend around at least a portion of a perimeter of an entranceway to a room; and a light control device including: a housing, a proximity sensor configured to detect a position of a door in a vicinity of the entranceway, a light controller disposed in the housing and in communication with the proximity sensor, and a battery pack removably installed in the housing and including a rechargeable battery; wherein the light controller is configured to control the light strip in response to a detected position of the door by the proximity sensor.

According to another aspect, a light strip control system may include: an LED light strip configured to be disposed along a majority of a perimeter of a frame enclosing an entranceway of a room; and a light control device including: an activity sensor configured to detect a position of a door in a vicinity of the entranceway, a light controller in communication with the activity sensor, and a rechargeable battery configured to power the light controller when the light controller is not powered by an AC power source; wherein the light controller is configured to control the light strip in response to a detected position of the door by the activity sensor.

According to another aspect, a light strip control system may include: an LED light strip; and a light control device including: an activity sensor configured to detect a position of a door in a vicinity of an entranceway, a light controller in communication with the activity sensor, and a rechargeable battery pack configured to power the light controller when the light controller is not powered by an AC power source; wherein the light controller is configured to control the LED light strip in response to a detected position of the door by the activity sensor.

Features, functions, and advantages may be achieved independently in various embodiments of the present disclosure, or may be combined in yet other embodiments, further details of which can be seen with reference to the following description and drawings.

DETAILED DESCRIPTION

Figure 1:
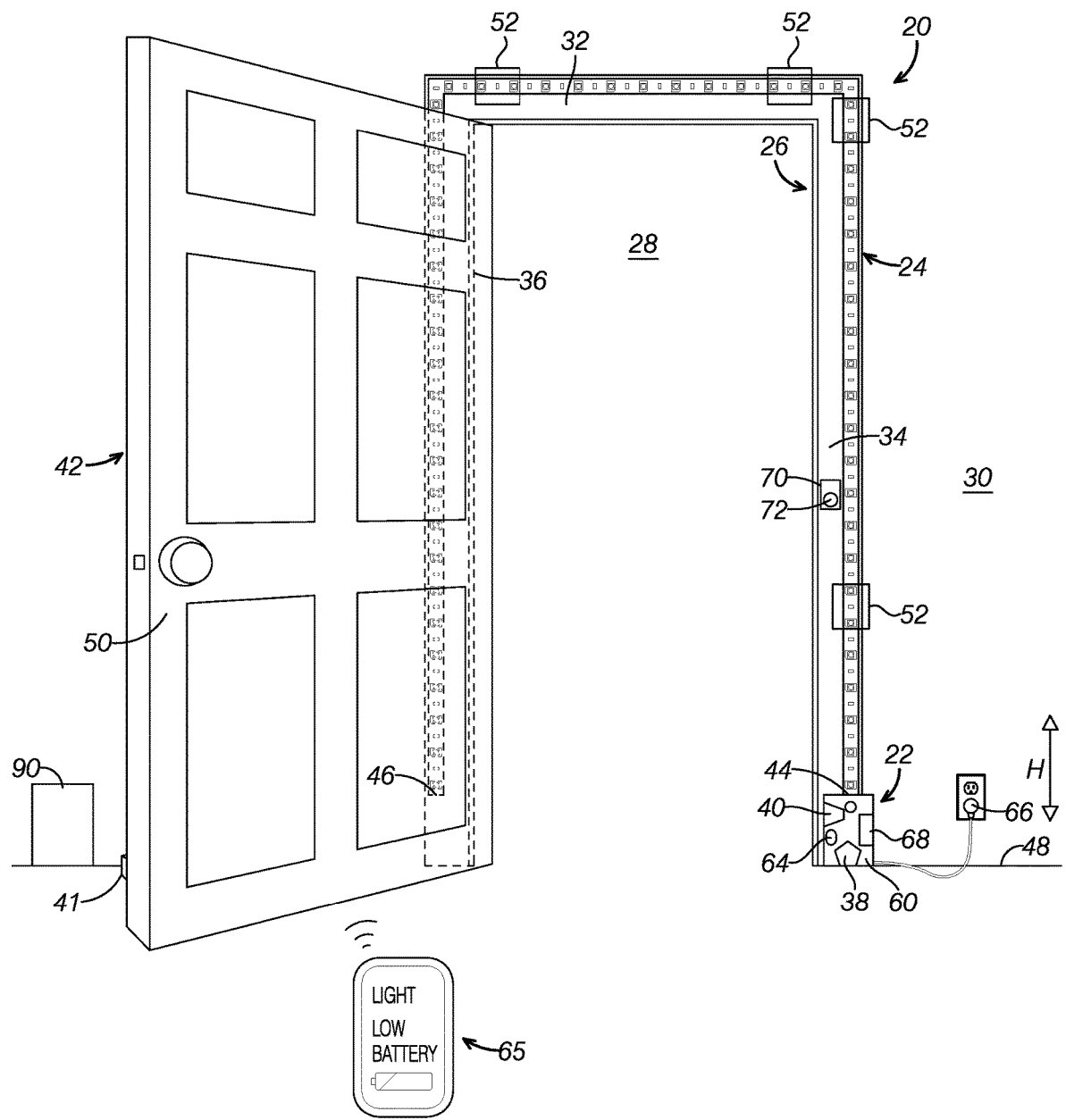
FIG. 1 is an illustrative light control system in accordance with aspects of the present disclosure, illustrating the light strip control system and an environment in which the light control system is implemented.

Various aspects and examples of light control devices and light control systems that turn on and turn off the light automatically in response to detection of an object in a vicinity of an entranceway and/or a motion pattern of the object in a vicinity of an entranceway or relative to the entranceway are described below and illustrated in the associated drawings. Unless otherwise specified, the light control devices and light control systems in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections A through F, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Coupled" means connected, either permanently or releasably, whether directly or indirectly through intervening components.

"Resilient" describes a material or structure configured to respond to normal operating loads (e.g., when compressed) by deforming elastically and returning to an original shape or position when unloaded.

"Rigid" describes a material or structure configured to be stiff, non-deformable, or substantially lacking in flexibility under normal operating conditions.

"Elastic" describes a material or structure configured to spontaneously resume its former shape after being stretched or expanded.

"Processing logic" describes any suitable device(s) or hardware configured to process data by performing one or more logical and/or arithmetic operations (e.g., executing coded instructions). For example, processing logic may include one or more processors (e.g., central processing units (CPUs) and/or graphics processing units (GPUs)), microprocessors, clusters of processing cores, FPGAs (field-programmable gate arrays), artificial intelligence (AI) accelerators, digital signal processors (DSPs), and/or any other suitable combination of logic hardware.

A "controller" or "electronic controller" includes processing logic programmed with instructions to carry out a controlling function with respect to a control element. For example, an electronic controller may be configured to receive an input signal, compare the input signal to a selected control value or setpoint value, and determine an output signal to a control element (e.g., a motor or actuator) to provide corrective action based on the comparison. In another example, an electronic controller may be configured to interface between a host device (e.g., a desktop computer, a mainframe, etc.) and a peripheral device (e.g., a memory device, an input/output device, etc.) to control and/or monitor input and output signals to and from the peripheral device.

Directional terms such as "up," "down," "vertical," "horizontal," and the like should be understood in the context of the particular object in question. For example, an object may be oriented around defined X, Y, and Z axes. In those examples, the X-Y plane will define horizontal, with up being defined as the positive Z direction and down being defined as the negative Z direction.

"Providing," in the context of a method, may include receiving, obtaining, purchasing, manufacturing, generating, processing, preprocessing, and/or the like, such that the object or material provided is in a state and configuration for other steps to be carried out.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

In general, a light control device of a light control system in accordance with the present teachings may include an activity sensor to detect an object in a vicinity of the entranceway and a light controller to control a light strip in response the detected object or a motion of the object. The light control device can be calibrated by a user to adjust when the light is turned on or turned on in response to the position or the motion of the object in the vicinity of the entranceway.

Aspects of light control devices and light control systems may be embodied as a computer method, computer system, or computer program product. Accordingly, aspects of the light control device and light control system may take the form of an entirely hardware embodiment, an entirely software embodiment (including firmware, resident software, micro-code, and the like), or an embodiment combining software and hardware aspects, all of which may generally be referred to herein as a "circuit," "module," or "system." Furthermore, aspects of the light control device and light control system may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable non-transitory, tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of light control system may be written in one or any combination of programming languages, including an object-oriented programming language (such as Java, C++), conventional procedural programming languages (such as C), and functional programming languages (such as Haskell). Mobile apps may be developed using any suitable language, including those previously mentioned, as well as Objective-C, Swift, C#, HTML5, and the like. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of the light control system may be described below with reference to block diagrams, apparatuses, systems, and/or computer program products. Each block and/or combination of blocks in a flowchart and/or block diagram may be implemented by computer program instructions. The computer program instructions may be programmed into or otherwise provided to processing logic (e.g., a processor of a general purpose computer, special purpose computer, field programmable gate array (FPGA), or other programmable data processing apparatus) to produce a machine, such that the (e.g., machine-readable) instructions, which execute via the processing logic, create means for implementing the functions/acts specified in the flowchart and/or block diagram block(s).

Additionally or alternatively, these computer program instructions may be stored in a computer-readable medium that can direct processing logic and/or any other suitable device to function in a particular manner, such that the instructions stored in the computer-readable medium produce an article of manufacture including instructions which implement the function/act specified in the flowchart and/or block diagram block(s).

The computer program instructions can also be loaded onto processing logic and/or any other suitable device to cause a series of operational steps to be performed on the device to produce a computer-implemented process such that the executed instructions provide processes for implementing the functions/acts specified in the flowchart and/or block diagram block(s).

Any flowchart and/or block diagram in the drawings is intended to illustrate the architecture, functionality, and/or operation of possible implementations of systems, methods, and computer program products according to aspects of the light control system. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

Examples, Components, and Alternatives

The following sections describe selected aspects of illustrative light control devices as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Light Control Systems and Light Control Devices

FIG. 1 shows a light strip control system 20 in accordance with aspects of the present disclosure, illustrating light strip control system 20 or a light control system 20 and an environment in which light strip control system 20 may be implemented. Light strip control system 20 comprises a light control device 22 and a light strip 24. Light strip control system 20 may be installed on a frame 26 enclosing an entranceway 28 of a room 30. Room 30 may be any inner space having an entranceway. For example, room 30 may be a closet, a storage room, a cabinet, or essentially any space where it is desirable to provide and/or control the lighting based on motions at the entranceway, such as motions of a door disposed in the entranceway. In some embodiments, light strip 24 may be a LED light strip. Light strip 24 may be disposed at least partially along frame 26 of entranceway 28. Frame 26 may include a header 32, a first vertical portion 34 and a second vertical portion 36. In the present application, header 32, first vertical portion 34 and second vertical portion 36 are used interchangeably with a header, a first jamb, a second jamb of entranceway 28, and their corresponding adjacent header trim, first vertical side trim, second vertical side trims of adjacent trims. In other words, light strip 24 may be disposed at least partially along or on the header, the first vertical side jamb and second vertical side jamb of entranceway 28 in one embodiment or disposed at least partially along or on the header trim, the first vertical side trim and the second vertical side trim in another embodiment.

Light control device 22 is connected to light strip 24 to control on and off of the light from light strip 24. Light control device 22 may include a light controller 38 and an activity sensor or a first activity sensor 40. Light controller 38 may include a processor and a memory. Activity sensor 40 detects an object in a vicinity of entranceway 28, a motion in the vicinity of entranceway 28, or a motion relative to entranceway 28 and sends signals to light controller 38. Activity sensor 40 may be a passive infrared (PIR) sensor, a time of flight (ToF) sensor, a magnetic field detector or any other form of proximity sensor. In some embodiments, light controller 38 controls on and off of light strip 24 based a detected object in the vicinity of entranceway 28 or based on a position of the object in a vicinity of entranceway 28. In some embodiments, light controller 38 controls on and off of light strip 24 based a motion pattern of an object detected by activity sensor 40.

Continuing FIG. 1, in the illustrated embodiment, room 30 may be a closet and entranceway 28 may be an opening of the closet. A door 42 is pivotally connected to second vertical portion 36 of frame 26 and configured to open toward an interior of room 30. Light strip 24 is used to provide light only, function as a primary light source, or a supplement light source for the closet. Light strip 24 has a connected end 44 and a distal end 46 opposite connected end 44. In the illustrated embodiment, light strip 24 extends substantially along an entire length of frame 26 from connected end 44 to distal end 46. It should be appreciated any light strip 24 may have any appropriated length to provide desired illumination. For example, a length of light strip 24 along frame 26 may be greater than 51% a perimeter of frame 26. In another example, the length of light strip 24 may be approximately 75% of the perimeter of frame 26. In yet another example, the length of light strip 24 may be approximately 85% of the perimeter of the frame 26. Light strip 24 may comprise multiple segments which are connected to form a desired length. Alternatively, connected end 44 may be disposed on a middle position on first vertical portion 34 closer to header 32 than a floor 48 or closer to floor 48 than header 32.

In the illustrative embodiment, light control device 22 is disposed inside room 30 adjacent to first vertical portion 34 of frame 26, connected to connected end 44 of light strip 24 and positioned on floor 48 of room 30. Alternatively, light control device 22 may be disposed on the middle position of first vertical portion 34 and connected to connected end 44 on the middle position directly or may be disposed on floor 48 and connected to connected end 44 via wire.

As light control device 22 is disposed on first vertical portion 34 adjacent to a free side 50 of door 42, activity sensor 40 can detect opening of door 42 when free side 50 of door 42 moves away from first vertical portion 34 and detect closing of door 42 when free side 50 moves toward first vertical portion 34. In some embodiments, activity sensor 40 may be a time of flight (ToF) sensor. The ToF sensor measures the time it takes an infrared (IR) beam to reflect off a nearby object, and it can determine a distance to the object from that information. When door 42 opens, activity sensor 40 can determine a distance of door 42 to activity sensor 40 and/or a motion pattern of door 42. In this way, different light modes are possible by programming light controller 38. Light controller 38 may be configured to turn on or turn off light strip 24 based on a distance of door 42 to a reference object such as activity sensor 40 or a housing of light control device 22. For example, light controller 38 may control light strip 24 to turn on once activity sensor 40 detects that door 42 moves away from first vertical portion 34. In another example, light controller 38 may control light strip 24 to turn on when door 42 moves away a predetermined distance from light control device 22. That is, light strip 24 is not turned on immediately after door 42 is opened. Instead, light strip 24 is turned on after door 42 has opened the predetermined distance. In yet another example, light strip 24 is turned off after activity sensor 40 detects that door 42 moves near or touches first vertical portion 34. In yet another example, light strip 24 is turned off after activity sensor 40 detects a motion pattern of door 42. The motion pattern may be a speed of door movement greater than a threshold, a sequence of opening, closing and opening, or any combination of opening and closing.

In some embodiments, activity sensor 40 may be a passive infrared (PIR) sensor. The PIR sensor measures infrared (IR) light radiating from an object in its field of view. Humans and inanimate objects emit a certain amount of IR radiation. The PIR sensor may consist of at least one pyroelectric sensor and a Fresnel lens. The curved lens concentrates infrared radiation toward the pyroelectric sensor. That is, the sensor view is a beam pattern. The PIR sensor receives concentrated amount of infrared energy under certain zones. When an object, such as a person, passes in front of the background, the temperature at that point in the sensor's field of view will rise from room temperature to body temperature, and then back again. The sensor converts the resulting change in the incoming infrared radiation into a change in the output voltage and send out the signal. A field of view of the PIR sensor may be less than 180° and may be as wide as 360°.

In some embodiments, activity sensor 40 may be a proximity sensor. In one example, proximity sensor 40 is a magnetic field sensor such as a Hall Effect sensor and includes a sensing body disposed in housing 60 and a magnet 41 attached to free side 50 of door 42 and substantially aligned with the magnetic field sensor at a height direction H. In one example, magnet 41 faces light control device 22 when door 42 is closed. When door 42 moves away from light control device 22, the magnetic field detected by activity sensor 40 changes. The magnetic sensor detects the change of magnetic field to determine a distance of door 42 to the activity sensor 40 or detect a motion of door 42. Similarly, the magnetic field detected by activity sensor 40 changes when door 42 moves toward light control device 22. In some embodiments, light controller is configured to turn on light strip 24 when free side 50 of door 42 is detected to be spaced apart from first vertical portion 34 at a first predetermined distance (i.e., a door opening event) and turn off light strip 24 when the door is detected to be spaced apart from first vertical portion 34 at a second predetermined distance (i.e., a door closing event). The first predetermined distance is greater than the second predetermined distance. In one example, the second predetermined distance may be about zero.

It should be appreciated that various types of proximity sensors to detect a presence of a nearby object may be used as activity sensor 40. For example, the proximity sensor may be a short-range infrared (IR) sensor. In other example, the proximity sensor may be a capacitive sensor, a capacitive displacement sensor, a Doppler effect sensor, an inductive sensor, an optical sensor (e.g., photoelectric, photocell (reflective), a laser rangefinder), a passive sensor (e.g., charge-coupled devices), a passive infrared sensor, a passive thermal infrared sensor, a radar, a reflection of ionizing radiation sensor, a sonar, an ultrasonic sensor, or a fiber optics sensor.

It should be appreciated that activity senor 40 may be connected to a hinge side of door 42. The hinge side is opposite to free side 50 and connected to frame 26.

In some embodiments, light control system 20 may include a plurality of light strip clip 52 attached to frame 26 or on a wall adjacent to frame 26 to secure light strip 24. Light strip clips 52 may be attached on frame 26 via adhesive at selected positions. The light strip clip will be described in detail in FIGS. 8-12.

In some embodiments, light controller 38 and activity sensor 40 of light control device 22 are at least partially contained in a housing 60. In some embodiments, light control system 20 may further include a transceiver 64 disposed in housing 60 of light control device 22 to enable communication with an electronic device 65 such as smart phone. For example, a user may select a light control mode via a user interface on electronic device 65. Further, light control device 22 may send an alert to electronic device 65 alerting a low battery level of a battery pack 68.

As shown in FIG. 1, light control device 22 may include an electrical plug 66 to be coupled to a power outlet. Light control device 22 may further include an adaptor (not shown) to provide direct current (DC) power appropriate for light control device 22 and light strip 24. Alternatively or additionally, light control device 22 may include a battery pack 68 to provide power.

In some embodiments, light control system 20 may further comprise a sensor module 70 to detect a position/motion of a user's hand relative to entranceway 28 or to detect the user's hand signals and electrically communicate with light controller 38. Sensor module 70 may be disposed on at a position approximately around a middle point of first vertical portion 34 or a position to detect hand signals/hand gestures of a user. In some embodiments, sensor module 70 may be an accelerometer installed flush against first vertical portion 34 or a door jamb. In one embodiment, a spring 72 may be used to bias accelerometer 70 against the door jamb. When a user knocks or taps the door jamb gently, the vibration will be detected by accelerometer 70. Light controller 38 may be configured to recognize and determine different motion patterns of knocking/tapping by a hand of the user and activate corresponding light modes. Light controller 38 may be configured to control the light strip 24 only in response to the tapping patterns detected by accelerometer 70 when door 42 is detected by activity sensor 40 to be remained at an opening position for a preset time period or no door is present in entranceway 28. In other words, when a door is not detected at a preset distance from light control device 22 or no door installed in entranceway 28, controlling light strip 24 in response to detected tapping patterns from accelerometer 70 overrides the controlling light strip 24 in response to the signal from activity sensor 40. The tapping pattern may be a number of taps on the first vertical portion 34 or door jamb at a predetermined time period. For example, light controller 38 is configured to turn on light strip 24 when the tapping pattern is tapping once on first vertical portion 34 by a user and turn off light strip 24 when the tapping pattern is tapping twice on first vertical portion 34 by the user. In another example, light controller 38 is configured to turn on light strip 24 at a lower brightness when the tapping pattern is tapping three times on first vertical portion 34 by the user. Various tapping patterns may be possible to be recognized by light control 38 and control light strip 24 accordingly. It should be appreciated that accelerometer may be installed on the vertical portion or the door jamb at any appropriate position. For example, the accelerometer may be installed at a position between a middle point of the vertical portion or the door jamb as long as the tapping/knocking by the user can be detected by the accelerometer. In some embodiments, sensor module 70 may be a short-range infrared (IR) sensor that detects a position/a motion of a user's hand signals in a vicinity of vertical portion or a door jamb. The motion pattern may be the user's hand signals such as extending into entranceway 28 and then retracting back. For example, light strip 24 is turned on when the user waves a hand once across entranceway 28 and light trip 24 is turned off when the user waves a hand twice across entranceway 28. Various hand signals may be possible to create patterns recognizable by light controller 38.

In some embodiments, sensor module 70 may include a capacitive-touch sensor that detects a touch pattern of a user's hand on sensor module 70.

Although sensor module 70 is illustrated to be positioned separately from activity sensor 40, it should be appreciated that various configurations are possible. For example, a sensor module and an activity sensor may at least partially be enclosed in a sensor housing. In one embodiment where the sensor module is an accelerometer and the activity sensor is a proximity sensor or a short-range IR sensor, both accelerometer and the proximity sensor or the short-range IR sensor may be enclosed in the sensor housing. The sensor housing may be installed a halfway on the door jamb or at a position for easy detection of hand signals (e.g., tapping patterns). In some embodiments, an ambient light sensor may also be included in the sensor housing and all sensors are included in the sensor housing. Alternatively, the sensor housing and the housing for the light controller may be combined. That is, the control related components such as various sensors and light controller are integrated in one housing.

It should be appreciated that the sensor module may be any appropriate sensor module that that can detect the user's hand signals relative to the entranceway or an interaction of the user's hand to the vertical portion of the entranceway. For example, the sensor module may be a button to create a motion pattern by a user and the motion pattern is recognizable by the light controller.

Light control system 20 may further comprise a connecting device 90 to connect light control device 22 or light control system 20 with a home automation system.

Figure 2:
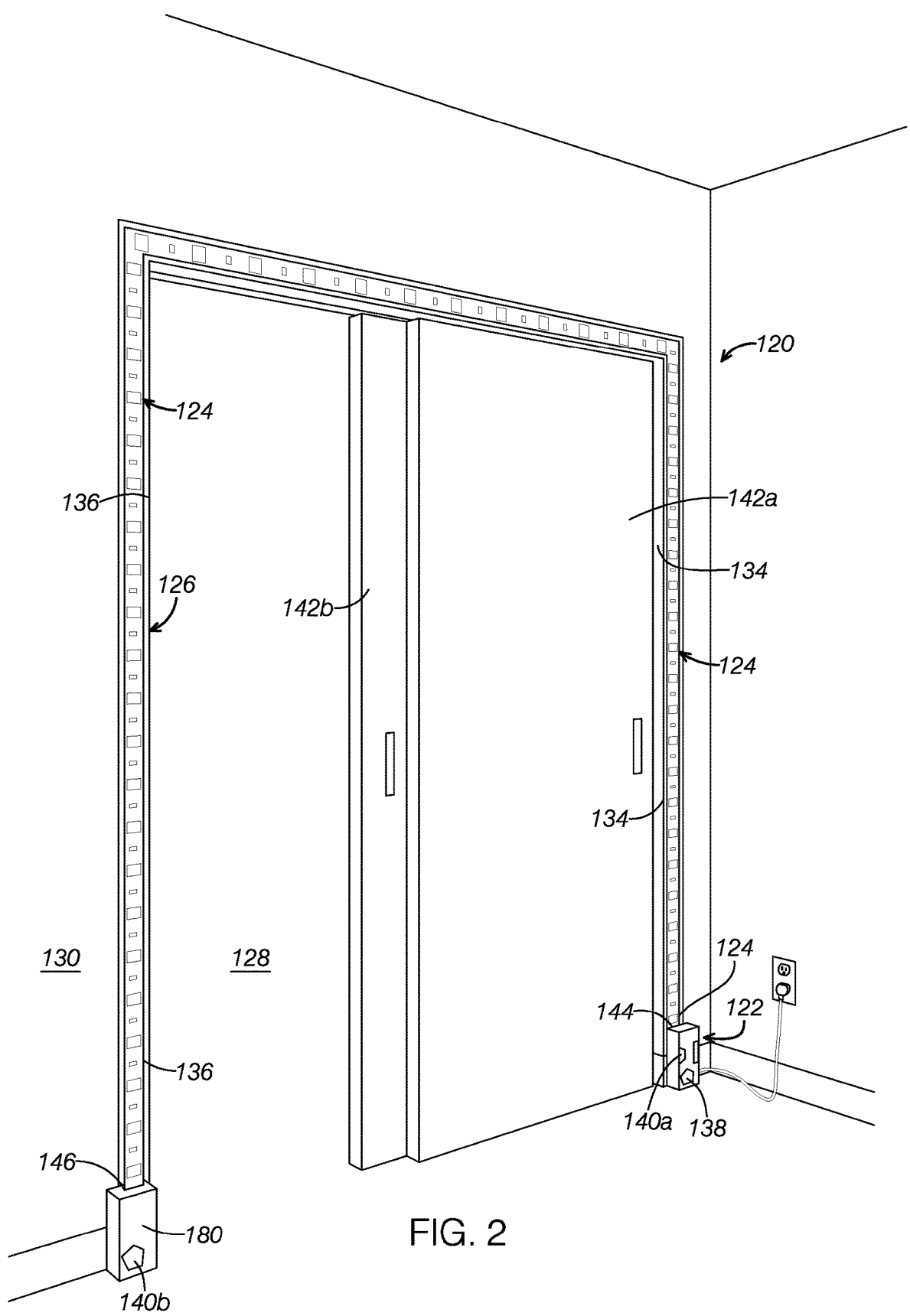
FIG. 2 is an illustrative light control system in accordance with aspects of the present disclosure, illustrating the light strip control system and an environment in which the light control system is implemented.

FIG. 2 shows a light strip control system or a light control system 120, illustrating another of light control system 120 and an environment in which light control system 120 is implemented. Light control system 120 is used for an entranceway 128 closed by a first door 142a and a second door 142b. Entranceway 128 may be an opening of a closet. First door 142a and second door 142b may be sliding doors moveable along a rail (not shown) to open and close entranceway 128. Light control system 120 is similar to light control system 20. For the sake of brevity, in this example, the elements and features similar to those previously shown and described will not be described in much further detail. In other words, differences between the present embodiment and the embodiment of FIG. 1 will be mainly described. Light strip control system 120 comprises a light control device 122 and a light strip 124. Light strip control system 120 may be installed on a frame 126 enclosing an entranceway 128 of a room 130. In some embodiments, light strip 124 may be a LED light strip. Light strip 124 may be disposed at least partially along frame 126 of entranceway 128.

Light control device 122 is connected to a first end of light strip 124 to control on and off of light strip 124. Light control device 122 may include a light controller 138 and an activity sensor or a first activity sensor 140a. First activity sensor 140a detects an object in a vicinity of entranceway 128 or a vicinity of first vertical portion 134 and sends signals to light controller 138. First activity sensor 140a may be a passive infrared sensor, a time of flight (ToF) sensor, a proximity sensor or a magnetic field detector. In some embodiments, light controller 138 controls on and off of light strip 124 based on a motion pattern of first door 142a or second door 142b detected by first activity sensor 140a or based on a presence of first door 142a or second door 142b in a vicinity of entranceway 128.

Continuing FIG. 2, in the illustrated embodiment, room 130 may be a closet. A length of light strip 124 along frame 126 may be greater than 51% a perimeter of frame 126 of entranceway 128. Light strip 124 has a connected end 144 and a distal end 146 opposite connected end 144. At a first closed position, first door 142a is adjacent to a first vertical portion 134 and second door 142b is adjacent to second vertical portion 136. In one embodiment, first door 142a is slidable along a width of entranceway 128 until one edge is adjacent to second vertical portion 136 such that first door 142 reaches a second closed position. At the second closed position, first door 142a is adjacent to second vertical portion 136 and second door 142b is adjacent to first vertical portion 134. Light control device 122 is disposed inside room 130 adjacent to first vertical portion 134 of frame 126 and connected to connected end 144 of light strip 124. First activity sensor 140a detects a position or a presence of first door 142a or second door 142b in a vicinity of light control device 122 or adjacent to first vertical portion 134. That is, first activity sensor 140a detects opening and closing of first door 142a or second door 142b relative to first vertical portion 134.

Light control system 120 may further comprise a second activity sensor 140b and is held in a second housing 180. Second housing 180 is positioned adjacent to second vertical portion 136. Second activity sensor 140b is disposed in second housing 180 at a position to detect a position or a motion of second door 142b or first door 142a in a vicinity of second vertical portion 136. Signals from second activity sensor 140b may be transmitted to light controller 138 by data line along light strip or wirelessly. In other words, second activity sensor 140b is communicated with light controller 138 via the data line of light strip 124.

For instance, the light control device of this embodiment may be configured to turn on the light strip when the door (such as an edge portion of the door) is detected to be spaced apart from a housing of the light control device (such as the housing of first activity sensor 140a or the housing of second activity sensor 140b) by a first predetermined perpendicular distance and turn off the light strip when the door is detected to be spaced apart from the housing by a second predetermined perpendicular distance, and the first predetermined perpendicular distance is greater than the second predetermined perpendicular distance. In this manner, the light control device can be configured to turn on the light strip when a sliding door is opened by some desired amount, and to turn off the light strip when the sliding door is closed to a predetermined (and perhaps user selectable) extent.

In some embodiments, second activity sensor 140b is electrically connected to light strip 124 so that it is powered by voltage from distal end 146 of light strip 124.

Figure 3:
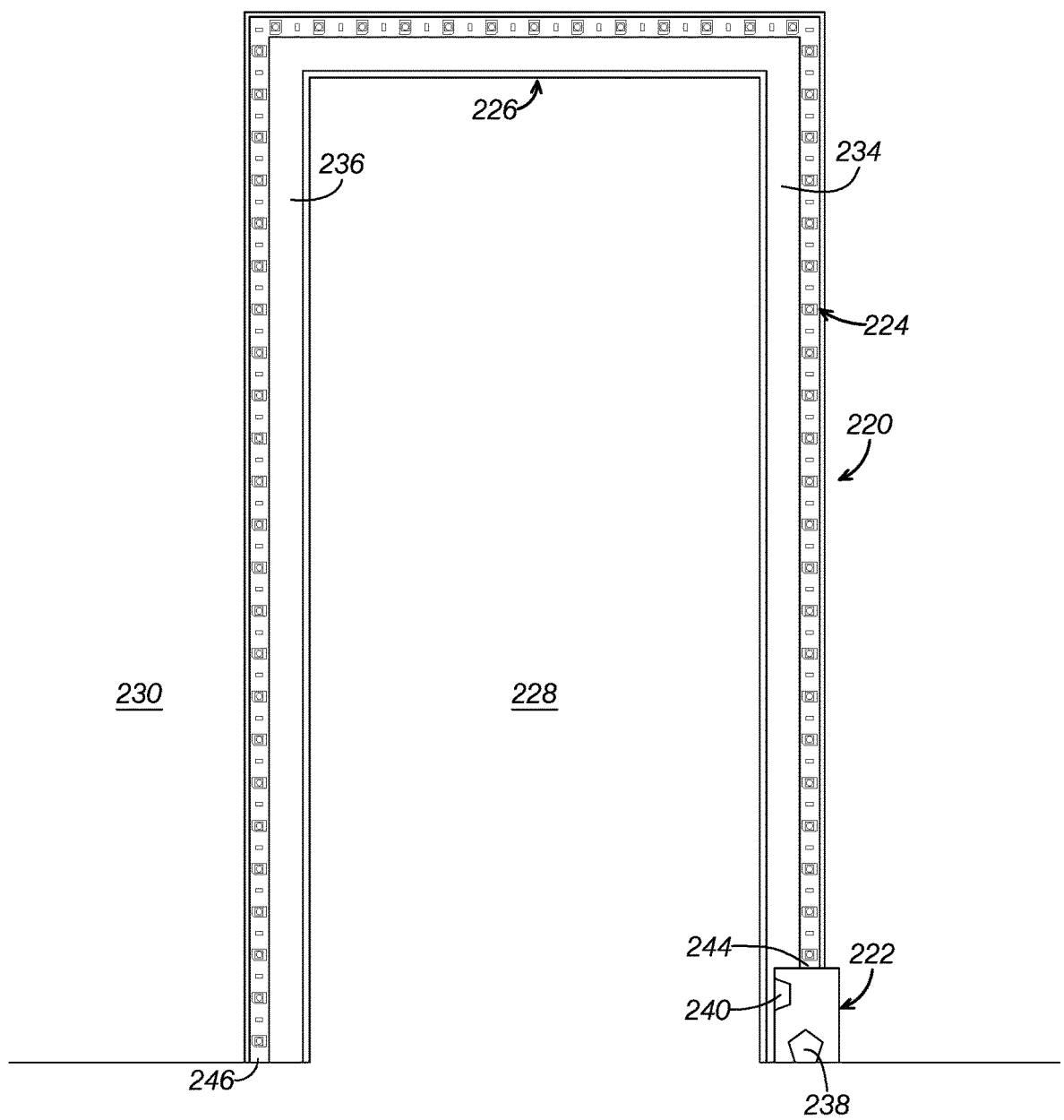
FIG. 3 is an illustrative light control system in accordance with aspects of the present disclosure, illustrating the light strip control system and an environment in which the light control system is implemented.

FIG. 3 shows a light strip control system or a light control system 220, illustrating another light strip control system 220 and an environment in which light control system 220 is implemented. Light control system 220 is used for an entranceway 228 without a door. Light control system 220 is similar to light control system 20. For the sake of brevity, in this example, the elements and features similar to those previously shown and described will not be described in much further detail. In other words, differences between the present embodiment and the embodiment of FIG. 1 will be mainly described. Light strip control system 220 comprises a light control device 222 and a light strip 224. Light strip control system 220 may be installed on a frame 226 that runs around a perimeter of an entranceway 228. In some embodiments, light strip 224 may be a LED light strip. Light strip 224 may be disposed at least partially along frame 226 of entranceway 328.

Continuing FIG. 3, in the illustrated embodiment, room 230 may be a closet. A length of light strip 224 along frame 226 may be greater than 51% a perimeter of frame 226 of entranceway 228. Light strip 224 has a connected end 244 and a distal end 246 opposite connected end 244. Light control device 222 is disposed inside room 230 adjacent to a first vertical portion 234 of frame 226 and connected to connected end 244 of light strip 224.

Light control device 222 is configured to control on and off of the light strip 224. Light control device 222 may include a light controller 238 and an activity sensor 240. Activity sensor 240 detects an object or a motion pattern in a vicinity of first vertical portion 234 of entranceway 228 and send signals to light controller 238. The object may be a person. Activity sensor 240 may send a signal to trigger the light on when the person walks across the entranceway or when a hand of the person passes through a plane containing the entranceway. In some embodiments, activity sensor 240 may be a PIR sensor.

FIGS. 1-3 illustrate exemplary environments in which the light control systems and light control devices of the present disclosure may be implemented. It should be appreciated that the light control systems and light control devices of the present disclosure can be implemented in other environments or in various enclosures. For example, the room may have various types of doors, such as a door pivotally connected to an opening via hinges, a bifold door, or a sliding door. In other examples, the room may be a closet, a storage room, a drawer, a cabinet, or essentially any space where it is desirable to provide and/or control the light.

Figure 4:
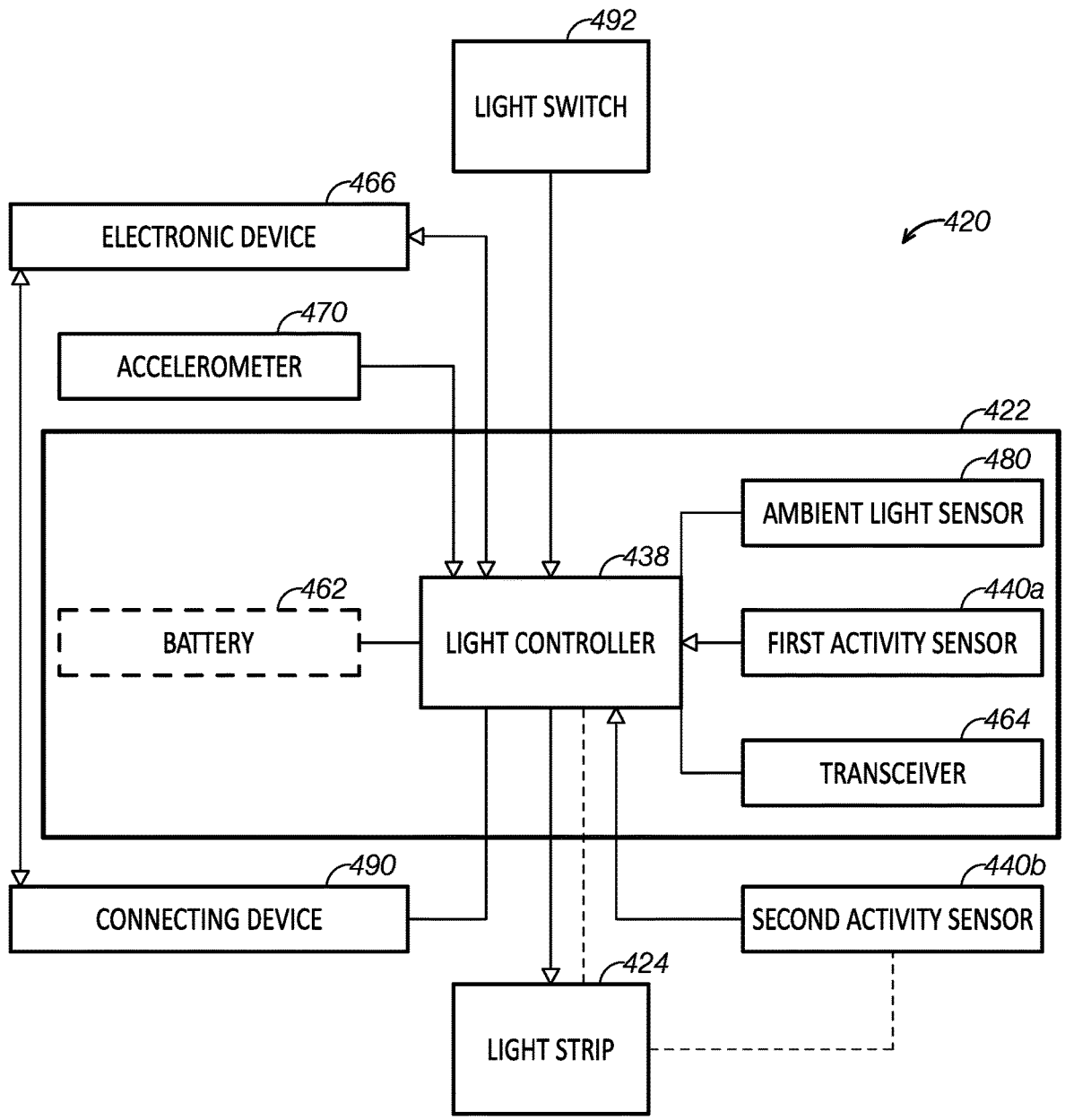
FIG. 4 is a schematic diagram of an illustrative light control system as described herein.

FIG. 4 is a schematic block diagram of a light strip control system 420 according to one aspect of the present disclosure. Light strip control system or light control system 420 comprises a light control device 422 to control light or light from a light strip 424 based on signals from a first activity sensor 440a and/or a second activity sensor 440b. First activity sensor 440a and second activity sensor 440b are configured to detect a position and/or a motion pattern of an object in a vicinity of an entranceway. First activity sensor 440a and second activity sensor 440b may be a passive infrared sensor, a time of flight (ToF) sensor, a proximity sensor, a magnetic field detector or any appropriate sensors that detects a position of an object or a motion of the object.

Light controller 438 controls on and off of light strip 424 based on signals from first activity sensor 440a and is configured to have a plurality of light modes. In some embodiments, light control modes may be activated automatically based on a presence of an object or a motion pattern of an object in a vicinity of an entranceway. For example, light is controlled to be turned on when an object (e.g., a door) is detected to move a predetermined distance away from the entranceway and to be turned off when the object is detected to move toward the entranceway. In one example, a sensing distance to trigger the operation of the light strip may correlate a position of first activity sensor on a housing of light control device 422. In one embodiment, the sensing distance is fixed. However, the position of first activity sensor 440a on a housing of light control device 422 may be adjusted and thus the position of the object at which the light is controlled to be turned on or off can be adjusted although the sensing distance is fixed. For example, first activity sensor 440a may be disposed on a selector mechanism on the housing of light control device 422. A user can adjust the position of first activity sensor 440a via the selector mechanism such that, for instance, light is turned on when a door has opened to a desired distance.

Light controller 438 may be configured to recognize and determine different motion patterns and activate corresponding light modes. The motion patterns may be based on the interaction of an object relative to the entranceway. The object may be a door of the entranceway or a person. In some embodiments, a first motion pattern may be a movement of the door away from the door or opening of the door, which corresponding to a mode of light being on. A second motion pattern may be a movement of the door toward the door or closing of the door, which corresponding to a mode of light being off. In another example, a motion pattern of opening, closing and reopening of the door may correspond to a "no disturbance" mode. At the "no-disturbance" mode, the light strip 424 is off even the door is open. Similarly, in a setting in which there is no door at an entranceway, a motion pattern of a user's hand gesture of extending into, retracting and reextending into the entranceway can be recognized and interpreted as a command to activate the "no-disturbance" mode. A "night light" mode may further be implemented via another motion pattern. For example, a motion pattern of opening, closing, reopening, closing and reopening of a door may correspond the "night light" mode in which light stays on at a lower brightness (approximately 20% of brightness for example) to provide night light for the room or an adjacent room. Motion patterns may include various combinations of the movements of the object relative to the entranceway, various interactions with the entranceway and/or speeds of the movement. Light controller 438 may be configured recognize the motion patterns and activate the light modes accordingly. It should be appreciated that the light modes are not limited to the modes described above and various light mode may be possible. For example, the mode may include a specific time, a door distance, a light intensity, a light color, a period for light being turning and a motion speed of an object, and any combinations of above parameters. When the light controller is connected to an electronic device such as a smart phone, a user may input a desired mode via a user interface and the light controller will execute the instructions and control the light accordingly.

In some embodiments, light control device 422 may include a socket adapter configured to plug into a light fixture in the room to draw power. Socket adapter is described in detail in FIG. 14. In this scenario, a light switch 492 in the room can be set up in the "on" position all the time. Light controller 438 may be programmed to recognize the motion patterns of light switch 492 and activate corresponding light modes. For example, a motion pattern of light switch 492 in a sequence of "off" and then "on" may activate a "no-disturbance" mode. In another example, a motion pattern of "off", "on", and then "off" may activate a "night light" mode.

In some embodiments, light control system 420 may further comprise an accelerometer 470 electrically communicated with light controller 438. The interaction with the entranceway is knocking or tapping on the entranceway. For, example, accelerometer 470 may be installed to flush up against a door jamb. When a user knocks or taps the door jamb or an area adjacent to accelerometer 470 gently, the vibration will be detected by accelerometer 470. Light controller 438 may be configured to recognize different motion patterns of knocking/tapping and activate corresponding light modes or control the light strip accordingly.

In some embodiments, light control device 422 may further comprise an ambient light sensor 480 to detect ambient light and determine light intensity of light strip 424 appropriate for the surrounding environment.

In some embodiments, light controller 438 may be configured to connect with an electronic device 466 such that the light control modes may be set up by a user via a user interface on electronic device 466. Light controller 438 may be communicated with electronic device 466 wirelessly. For example, a transceiver 464 may be included in a housing of light control device 422. In one embodiment, electronic device 466 may be a smart phone.

Via the light control application in the electronic device, a user can customize the light control mode. For instance, the light actuation may be set up to depend on the ambient light conditions via a user interface on the electronic device. In one example, a light control system may be configured to control the light strip installed under a kitchen cabinet, by turning on whenever the overhead light is turned on and turning off when an ambient light intensity exceeds a threshold. The ambient light intensity may be detected by an ambient light sensor. The user may also set up different modes for different hours in the day. For example, the light strip can be controlled to turn on at certain hours during the day regardless whether the overhead light is on.

In some embodiments, light control system 420 may further comprises a connecting device 490 for connecting light control system 420 to a home automation system.

In some embodiments, light control device 422 may include a battery 462 to provide the power needed by light control system 420.

In some applications, an entranceway may include two doors. First activity sensor 440a is configured to detect a position and/or a motion of a first door and a second activity sensor 440b is configured to detect a position and/or a motion of a second door. Light control device 422 is disposed on a first vertical portion adjacent to the entranceway. Second activity sensor 440b is disposed in a second housing which is disposed on a second vertical portion opposing the first vertical portion. Second activity sensor 440b may be connected to one end of light strip 424 to acquire a voltage needed for its function. Alternatively, second activity sensor 440n may be connected to light control device via wire. Further, second activity sensor 440b may be connected to light controller 438 wirelessly or via a data line in light strip 424.

Figure 5:
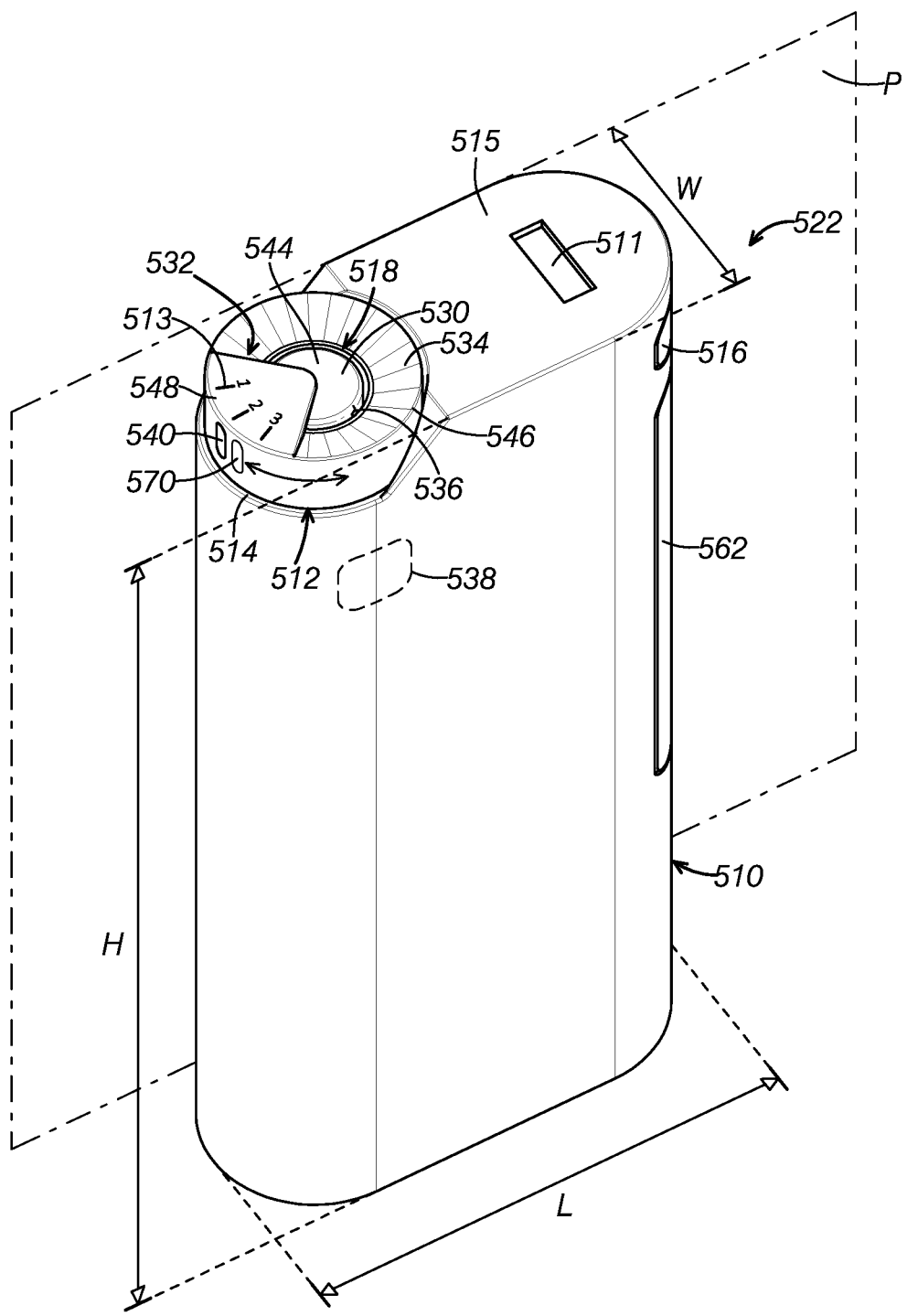
FIG. 5 is a perspective view of an illustrative light control device in accordance with aspects of the present disclosure.
Figure 6:
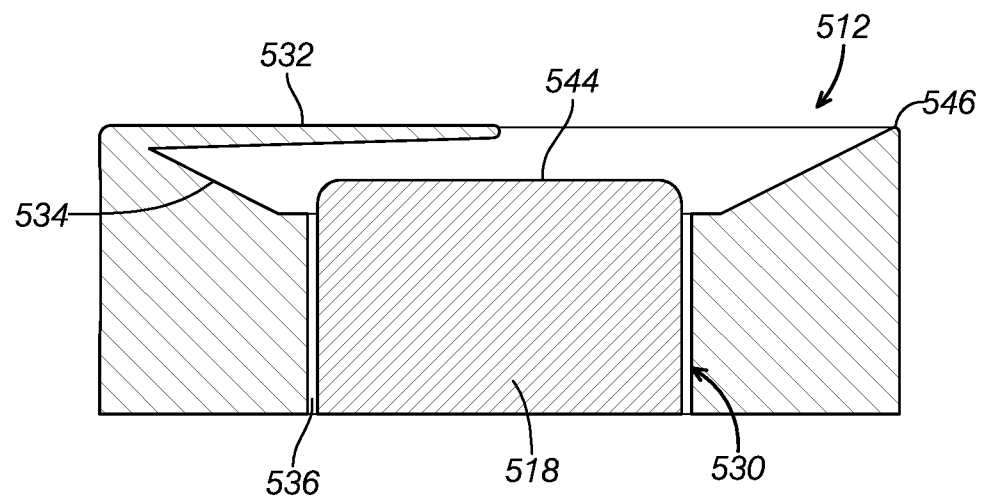
FIG. 6 is a cross-sectional view of a selector mechanism of the light control device in FIG. 5.

FIG. 5 is a perspective view of an illustrative light control device 522 in accordance with aspects of the present disclosure. FIG. 6 is a cross-sectional view of a selector mechanism of the light control device in FIG. 5. Referring to FIG. 5, light control device 522 comprises a housing 510 and a selector mechanism 512. In the illustrated embodiment, selector mechanism 512 is a rotatable wheel disposed on a top section 514 of housing 510. More generally, a selector mechanism according to the present teachings can be any movable or rotatable mechanism such as a switch, lever, dial, or the like, which is capable of being moved either continuously or discretely to a plurality of positions. Top section 514 is recessed from an upper surface 515 to create a receiving space to hold rotatable wheel 512. An activity sensor 540 is mounted on rotatable wheel 512 and moveable with rotatable wheel 512 or moveable relative to the housing. A light controller 538 is schematically shown in FIG. 5. Light controller 538 is disposed in housing 510 and configured to control a light strip based on a position, a motion and/or a motion pattern of an object in a vicinity of an entranceway. Housing 510 includes a slot 511 to receive a connected end of the light strip.

Activity sensor 540 is moveable with rotatable wheel 512 and can be secured at a plurality of selected positions upon a user selection. One selected position corresponds to one position of the object at which light strip is on when an object is detected. Light control device 522 may be calibrated to have multiple positions of the object at which light is on and/or off. A user can select a position of the object at which light is turned on by the selector mechanism 512 (e.g. rotatable wheel). In some embodiments, an indicator 513 may be shown on selector mechanism 512 to indicate a door opening position when the light is turned on. For example, indicator 513 may include scales 1, 2, and 3 corresponding degrees of a door opening position relative to a vertical portion of the door (e.g., door opened 15°, 25° and 45° relative to a plane P containing the entranceway). In the illustrated example, the user can move rotatable wheel 512 to adjust or calibrate the position of the object at which light is on and/or off.

Alternatively or additionally, light control device 522 may further comprise an ambient light sensor 570 to detect ambient light and determine appropriate light intensity of the light strip for the surrounding environment. In the illustrated embodiment, ambient light sensor 570 is disposed on rotatable wheel 512 at the same side as activity sensor 540. It should be appreciated that ambient light sensor 570 may be disposed at any appropriate places in housing 510.

In some embodiments, light control device 522 may further comprise an auxiliary sensor 518 for use in a "no door" setting. The "no door" setting refers to an environment in which there is no door at the entranceway or a condition where a door is left open. Auxiliary sensor 518 may be a PIR sensor. Auxiliary sensor 518 may be positioned on a middle portion of rotatable wheel 512. Auxiliary sensor 518 includes Fresnel lens 530 which concentrates infrared radiation to a beam pattern in a cone distribution. The cone distribution would create a zone outside the entranceway. FIG. 5 shows an imaginary plane P separates a room from an outside space. Light control device 522 is mounted in the room on one side of an imaginary plane P. As the field of view of auxiliary sensor 518 is straight up in a cone distribution, a zone of the cone distribution outside the room would detect a motion or an object outside the room and adjacent the entranceway. The light from the light strip thus activated by detection of outside object is undesirable. To address the issue, rotatable wheel 512 is configured to include a partial cover 532 to conceal a portion of Fresnel lens 530 of auxiliary sensor 518. For example, partial cover 532 can be rotated toward in a direction away from the room. As a result, the zone of the cone distribution outside the room is removed from the field of view to create a PIR blind spot such that presence of the object outside the entranceway is undetectable by the PIR sensor. In this way, the object or the motion of the object outside the room would not be detected and light is thus not activated accordingly.

Referring FIG. 5 and FIG. 6, in some embodiments, a top surface 534 of rotatable wheel 512 may be inclined toward auxiliary sensor 518 to form a reverse hollow frustum with an opening 536. Fresnel lens 530 is configured to protrude from opening 536 and an upper surface 544 of Fresnel lens 530 is positioned to be lowered than an upper edge 546 of rotatable wheel 512. Partial cover 532 extends from an arcuate edge 548 of rotatable wheel 512 toward auxiliary sensor 518 and partially covers rotatable wheel 512. In the illustrative embodiment, Partial cover 532 further partially covers auxiliary sensor 518.

In some embodiments, activity sensor 540 is positioned on a side of housing 510 corresponding partial cover 532. That is, partial cover 532 and activity sensor 540 move together. When activity sensor 540 is aimed at a door, partial cover 532 is at a position to block the field of view of auxiliary sensor 518 that is outside the entranceway.

Selector mechanism 512 is illustrated to be a rotatable wheel 512 in FIG. 5 and FIG. 6. It should be appreciated that selector mechanism can take various forms and can be placed in a plurality of positions on or in housing 510. For example, selector mechanism may include a slider moveable on a rail on the housing. Activity sensor 540 may be disposed on the slider. The position of detected object at which the light is activated can be adjusted or calibrated by moving the slider and securing slider at a preset position.

Light control device 522 is versatile and can be used in various configurations of entranceways. For example, light control device 522 can be use in a room with a door. Opening or closing of the door turns the light on or off. At a condition when the door is left open, auxiliary sensor 518 plays a role to control the light strip automatically. For example, walking into the closet activates the light while a motion outside the closet would not trigger the light due to the blind spot created by partial cover 532.

A light control device may be configured for use only for a no-door application. For example, the light control device for the no-door application may be similar to light control device 522 except without activity sensor 540. In this embodiment, auxiliary sensor 518 is a primary sensor for the light control device.

In some embodiments, light control device 522 may further comprise a battery pack 562 with rechargeable battery 563. Battery pack 562 may include one or multiple rechargeable batteries and an AC adapter. Housing 510 is configured to have a space to contain battery 563 and the AC adapter for connecting battery 563 with a power source from an electrical outlet. When light control device 522 is powered by being plugged into the power source, battery 563 is charged. Battery pack 562 may be used as a sole power source or as a supplement power source for light control device 522. Battery pack 562 is configured to be removable and can be ejected from housing 510 by pressing an ejection button 516. Inclusion of the battery pack has various advantages. For example, the battery can be charged by connecting the light control device with a power outlet and the housing of the light control device is used as a casing for connecting the battery with the power outlet. The charged battery allows the light control device to be used in an enclosure without a nearby power outlet. In another example, the light control device is used in an enclosure enabling a connection with a power, the battery can be placed in the light control device to be in full capacity constantly. The charged battery can be removed out for the use with other devices (e.g., a light control device disposed in different enclosures and devices using the same type of batteries).

In one embodiment, housing 510 may have a height H, a length L and a width W of approximately 5.7 inches, approximately 2.5 inches and approximately 1.33 inches, respectively. Light control device 522 may be mounted on a floor of a room or on a vertical portion of jamb or vertical trim adjacent to the entranceway.

Figure 7:
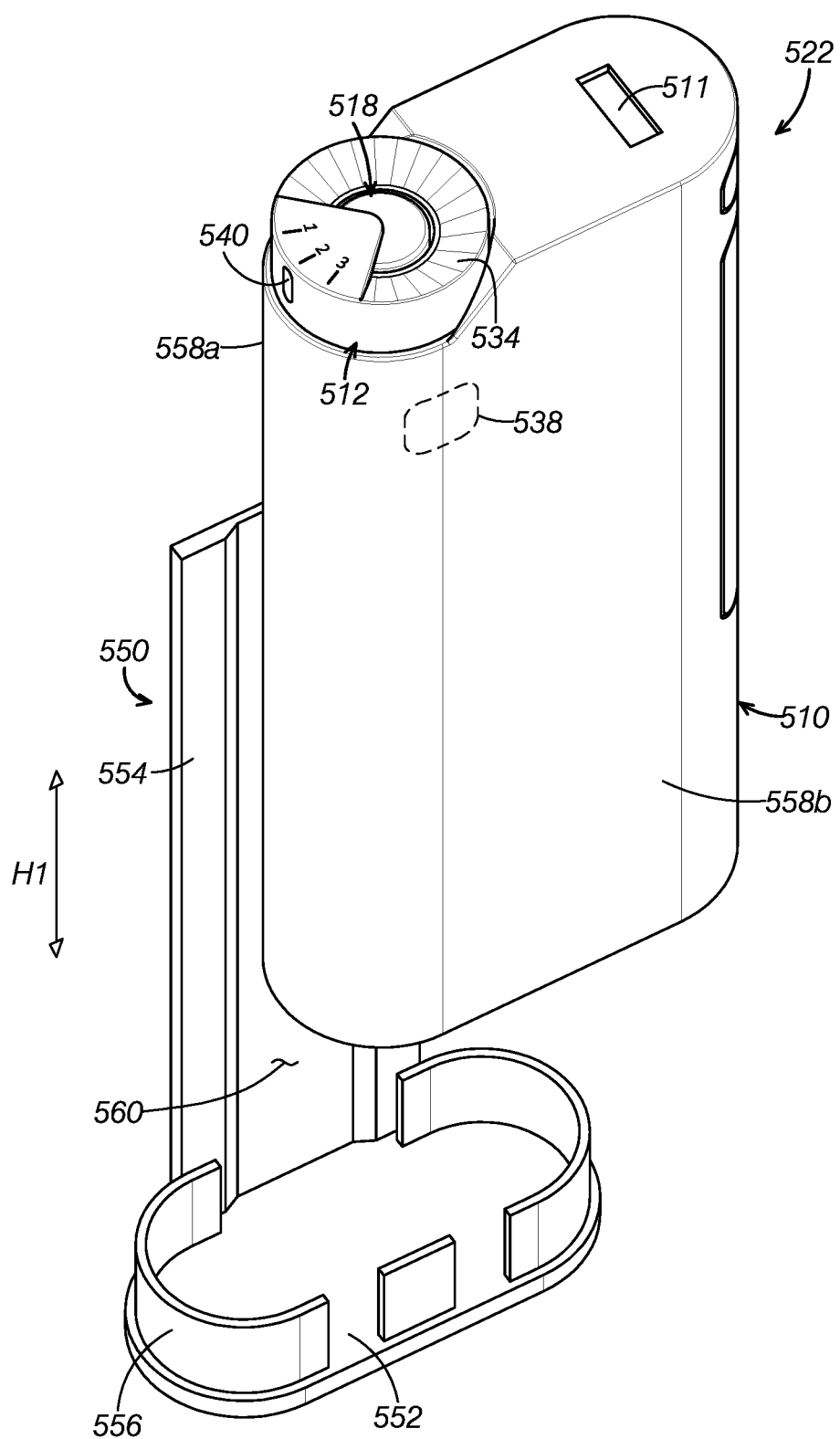
FIG. 7 is a perspective view of the light control device in FIG. 5, illustrating a stand to hold a housing of light control device.

In some embodiments, light control device 520 may further comprise a stand 550 to hold housing 510. Referring to FIG. 7, Stand 550 includes a base 552 and a back support 554 extending from base 552 at in a height direction H1 of housing 510 and tabs 556 extending at the height direction H1. Back support 554 and a side surface 558a or 558b of housing 510 form a channel 560 to receive wires of the LED light strip. Housing 510 is configured to be slidable in and out from stand 550 with either side surface 558a or side surface 558b facing back support 554.

Figure 8:
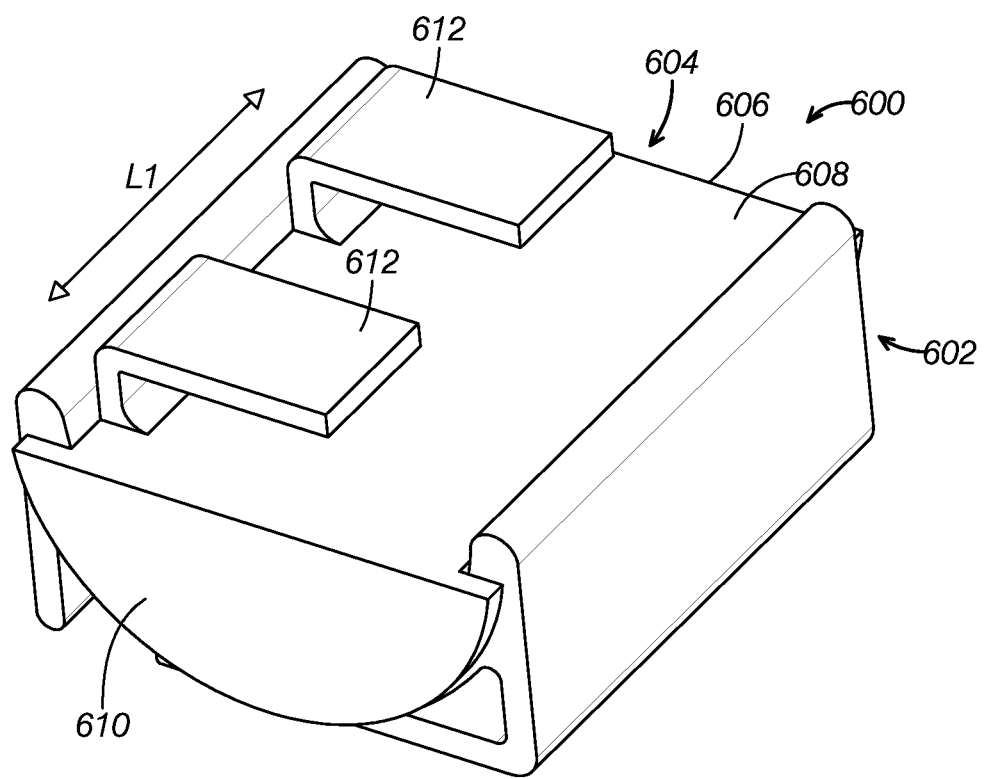
FIG. 8 is a perspective view of an illustrative light strip clip of a light control system in accordance with aspects of the present disclosure, illustrating the light strip clip at a normal position.

In some embodiments, a light control system may comprise a plurality of adjustable LED strip clips 600 to attach a light strip along an entranceway. Referring to FIGS. 8-11, an example light strip clip 600 is illustrated. As shown in FIG. 8, clip 600 includes a cradle piece 602 and a sickle piece 604 assembled on cradle piece 602. Referring FIGS. 8-9, sickle piece 604 includes an upper plate 606 having a flat surface 608, at least one arm 612, and a spine 614 and two side plates 610 forming an angle to upper plate 606. Arm 612 extends from flat surface 608 away from cradle piece 602 and is configured to hold a light strip. Arm 612 may have an L-shape. In the illustrated embodiment, clip 600 includes two arms 612 arranging a long a length direction L1 at one side of sickle piece 604. It should be appreciated that various configurations of arms are possible. For example, clip 600 may include a first arm and a second arm arranged at one side of sickle piece 604 and a third arm arranged at an opposite side of sickle piece 604 and positioned between the first arm and the second arm.

Figure 9:
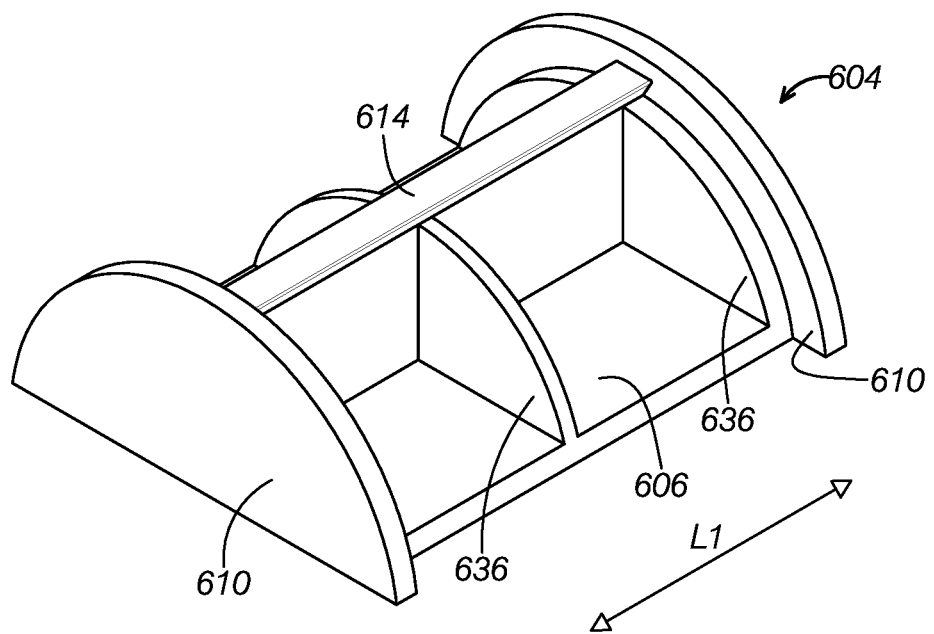
FIG. 9 is a perspective view of a sickle piece of the light strip clip in FIG. 8.
Figure 10:
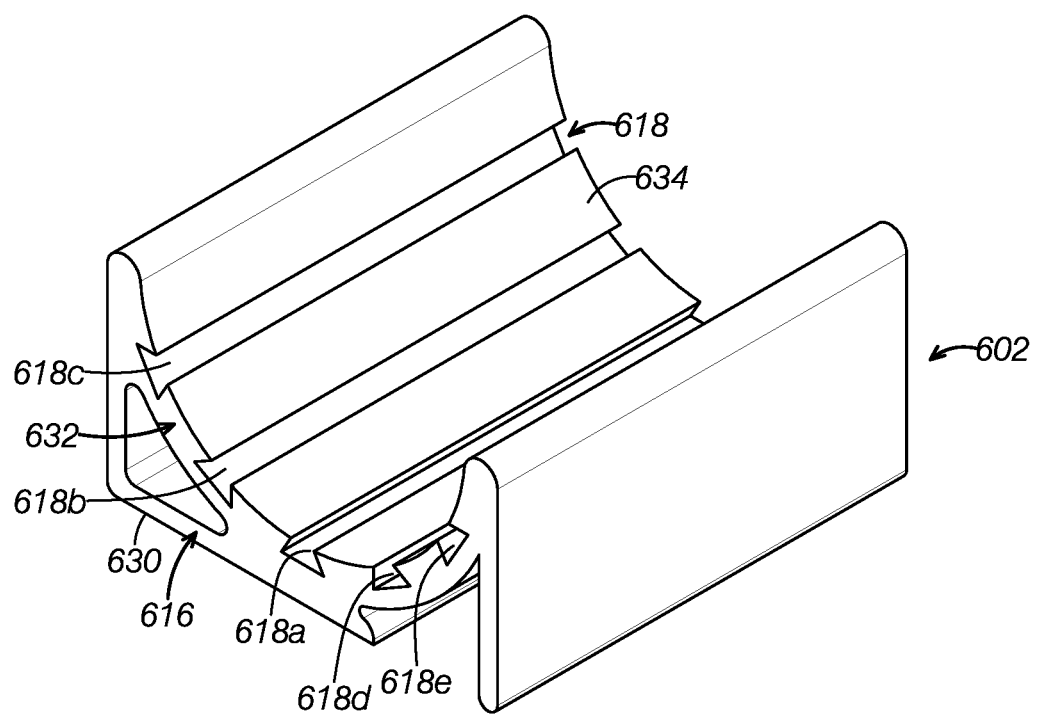
FIG. 10 is a perspective view of a cradle piece of the light strip clip in FIG. 8.

Continuing FIG. 9 and with further reference to FIG. 10, spine 614 of sickle piece 604 extends along a lengthwise direction L1 and is configured to be snapped into a plurality grooves 618 in cradle piece 602. A cross section of spine 614 may be a trapezoid and a distal side of trapezoid is greater than a proximal side such that spine is secured in grooves 618. Spine 614 may be made from resilient material and can be snapped in and pull out from grooves 618.

Sickle piece 604 may include two side plates 610. In the illustrative embodiment, side plates 610 extends from flat surface 608 toward a base 616 of cradle piece 602 and is substantially perpendicular to flat surface 608. Each of side plate 610 extends downward from upper plate 606 and spine 614 extends between two side plates 610 Sickle piece 604 may further include at least one support 636 between two side plates 610. Support 636 may be a segment of a circle and configured to rest on an arcuate upper surface 634 of cradle piece 602.

Referring to FIG. 10, a base 616 of cradle piece 602 includes a flat bottom surface 630. Cradle piece 602 further includes a cradle bed 632 having arcuate upper surface 634. A plurality of grooves 618 are formed on arcuate upper surface 634. In the illustrated embodiment, cradle piece 602 includes five grooves 618a, 618b, 618c, 618d and 618e. Cradle bed 632 has an arc shape as well. In the illustrated embodiment, side plate 610 of sickle piece 604 is a segment of a circle matching the arc shape of cradle bed 632.

Spine 614 of sickle piece 604 is connectable to the cradle piece via spine 614 at a plurality of positions including a normal position, a first tilted position and a second titled position. The plurality of grooves 618 include a first groove 618a corresponding to a lowest point of cradle bed 632, a second groove 618b spaced away from first groove 618a and a third groove 619c spaced away and adjacent to second groove 618b. Sickle piece 604 or clip 600 is at a normal position when spine 614 is positioned in first groove 618a.

At the normal position, flat surface 608 of sickle piece 604 is substantially parallel to a bottom surface 630 of cradle piece 602 as shown in FIG. 8. and the assembled light strip is oriented with a light beam in a direction substantially perpendicular to bottom surface 630 of cradle piece 602.

Figure 11:
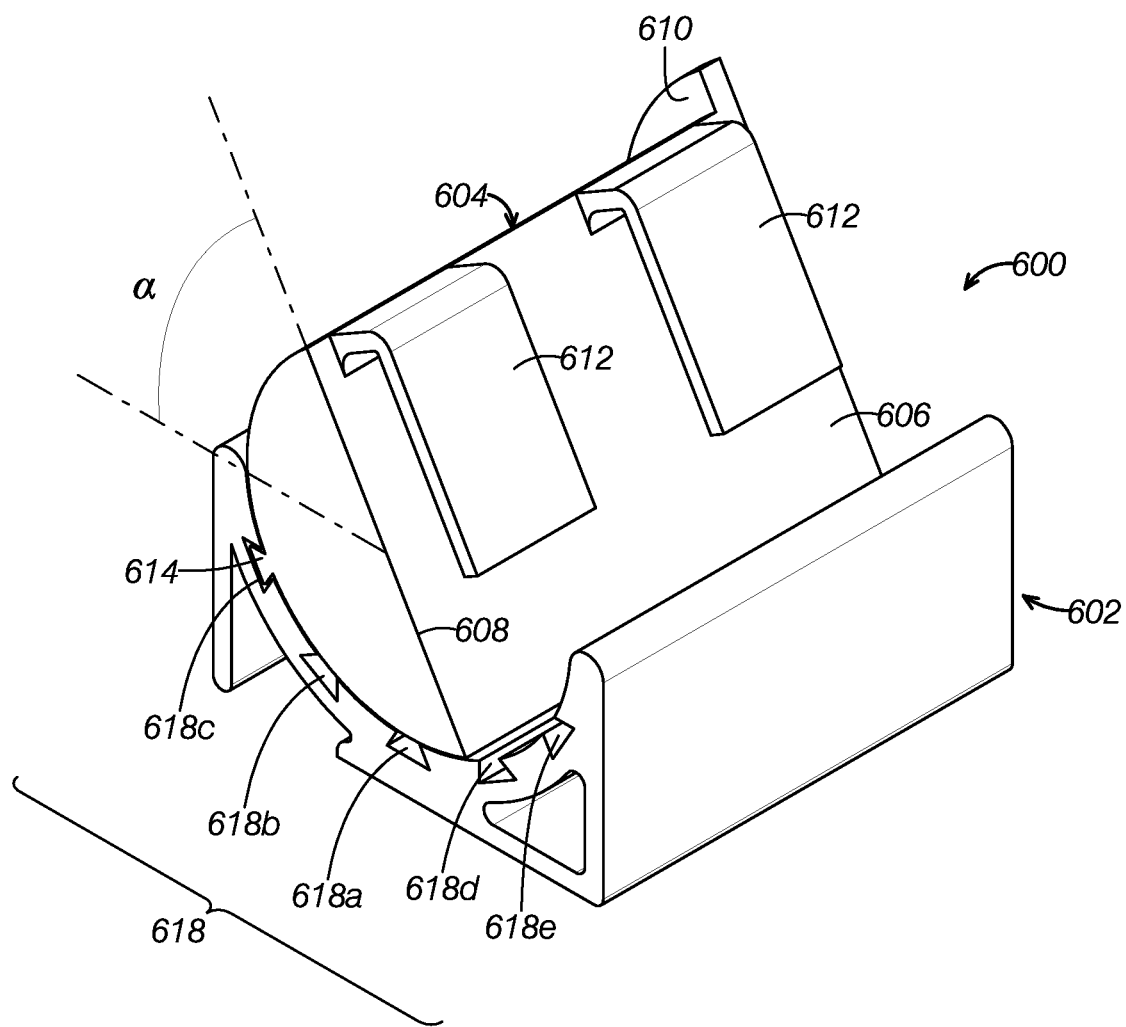
FIG. 11 a perspective view of the light strip clip in FIG. 8, illustrating the light strip clip at a tilted position.

FIG. 11 illustrates clip 600 at a tilted position and one side plate of sickle piece 604 is removed from FIG. 11 to view underlying components. When spine 614 is positioned in third groove 618c, clip 600 is at a tilted position at which flat surface 608 of sickle piece 604 forms an angle α with flat bottom surface 630 of cradle piece 602 as shown in FIG. 11. Similarly, when spine 614 is positioned in a second groove 618b, clip 600 is at another tilted position at which flat surface 608 of sickle piece 604 forms another angle with flat bottom surface 630 of cradle piece 602. When spine 614 is positioned in a fourth groove 618d or a fifth groove 618e, clip 600 is at different tilted positions and the sickle piece 604 is tilted at a different direction.

When the light strip is installed on an entranceway, at the tilted position shown in FIG. 11, the light strip on the clip is oriented at an angle and thus the light beam from light strip is directed toward the entranceway. By positioning spine 614 in different grooves 618, the light beam from the light strip can be adjusted to have different angles relative to a mounting surface. It should be appreciated that various number of grooves such as three grooves or more than five grooves are possible.

A light strip clip may take various form such that an angle between a flat surface of the sickle piece and a flat surface of the cradle piece is adjustable. For example, sickle piece 604 may have one side plate 610. Spine 614 can be inserted into one of grooves 618 until side plate 610 touches cradle piece 602. Clip 600 may be made from plastic or any other suitable material.

Figure 12:
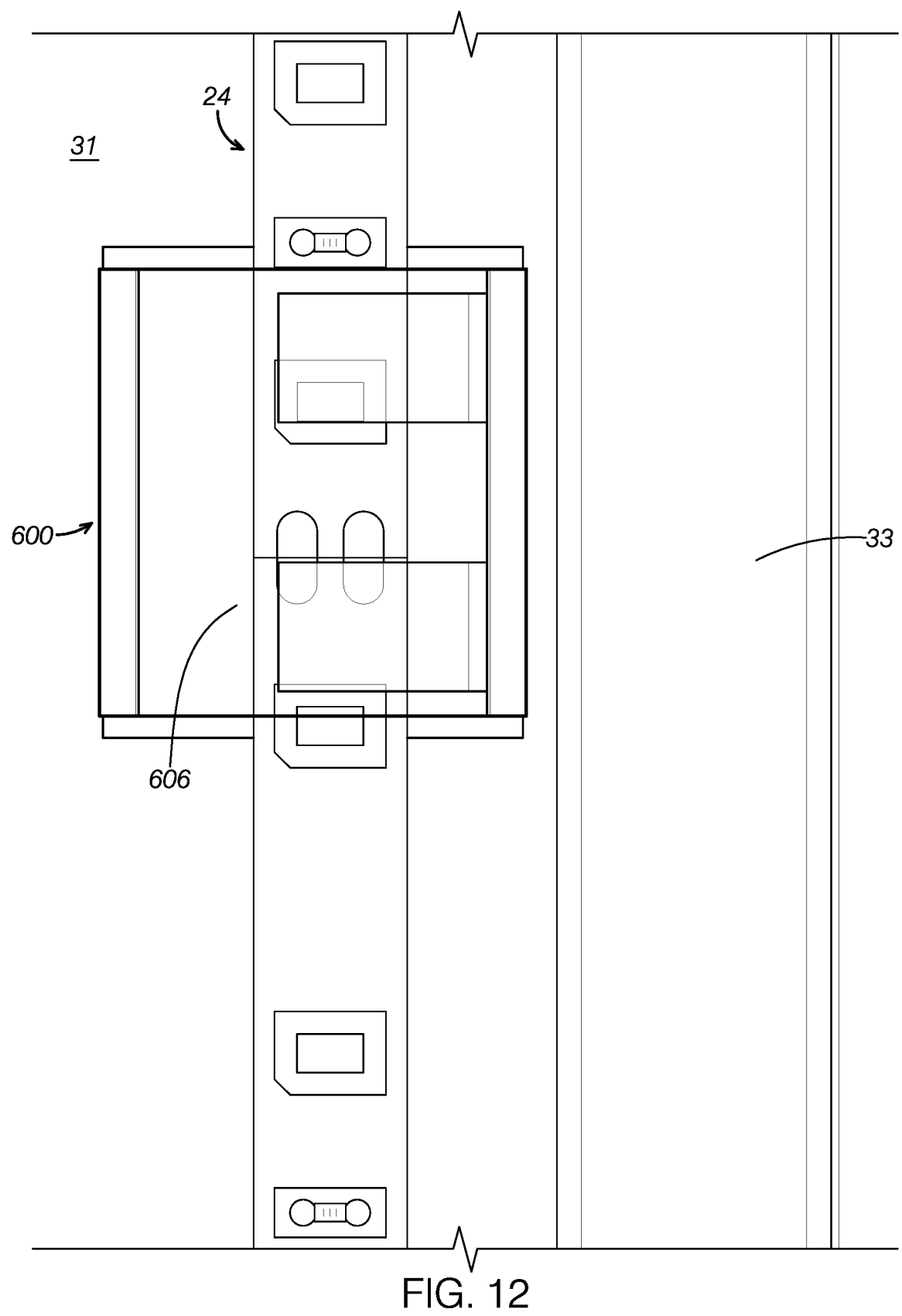
FIG. 12 is a plan view of the light strip clip in FIG. 8, showing a light strip assembled on the light strip clip.

FIG. 12 illustrates a light strip 24 and a light strip clip 600 at an assembled state. In some embodiments, the flat bottom surface 630 of clip 600 may include adhesive. In the illustrated embodiment, clip 600 is attached to a wall 31 and adjacent to a trim 33 of an entranceway. Light strip 24 is disposed on upper plate 606 of clip 600. A plurality of clips 600 may be disposed along a length of light strip 24 to secure light strip 24 to wall 31.

Figure 13:
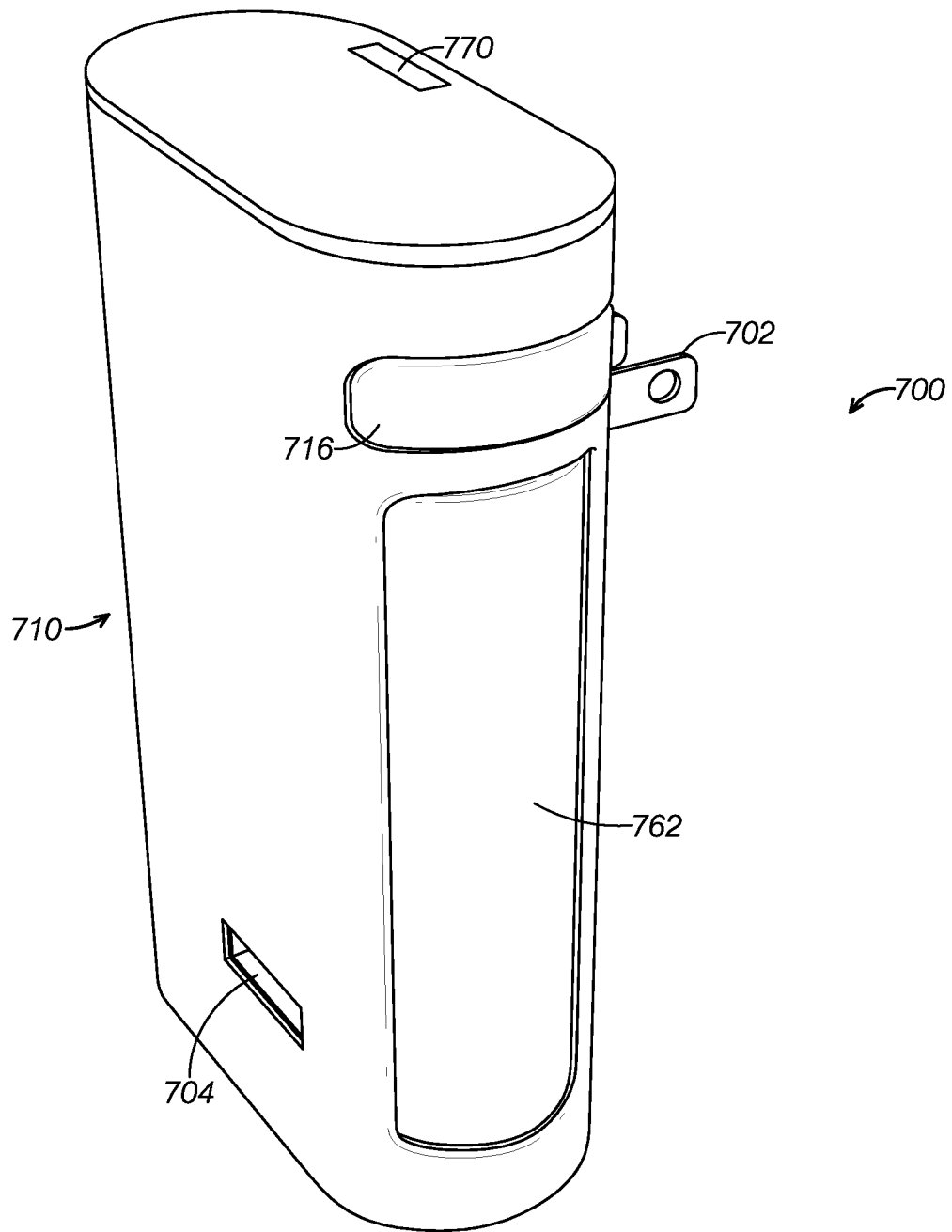
FIG. 13 is a perspective view of an illustrative connecting device of a light control system in accordance with aspects of the present disclosure.

FIG. 13 is a perspective view of an illustrative connecting device 700 of a light control system in accordance with aspects of the present disclosure. Connecting device 700 may connect the light control device with a smart home system or a home automation system. Connecting device 700 may be used as a bridge that connects the light control device to the home automation system such that a user can control the light control device using a simple voice command. Connecting device 700 may include a gateway that communicates using the existing communication protocols of the home automation system such as Bluetooth and Wi-Fi protocols.

Connecting device 700 may include a plug 702 to be plugged into a socket of a power outlet. Once plugged, connecting device 700 is running at a powered state and ready to provide the communication between the electronic devices.

Connecting device 700 may further include a battery pack 762 with rechargeable battery. Battery pack 762 is configured to be removable and can be rejected from a housing 710 by pressing a button 716. Battery pack 762 may be used as a power source for the light control device and other peripheral devices.

Connecting device 700 may further include a night LED (not shown) and an ambient light sensor 770 to detect ambient light. The nigh LED is activated when an intensity of the ambient light is below a threshold. That is, connecting device 700 may become a night light source at a dark environment.

Connecting device 700 may further include a USB port 704 for charging other devices. USB port 704 is shown on a side of housing 710. It should be appreciated that USB part 704 may be positioned at any appropriate part such as a bottom of housing 710.

Figure 14:
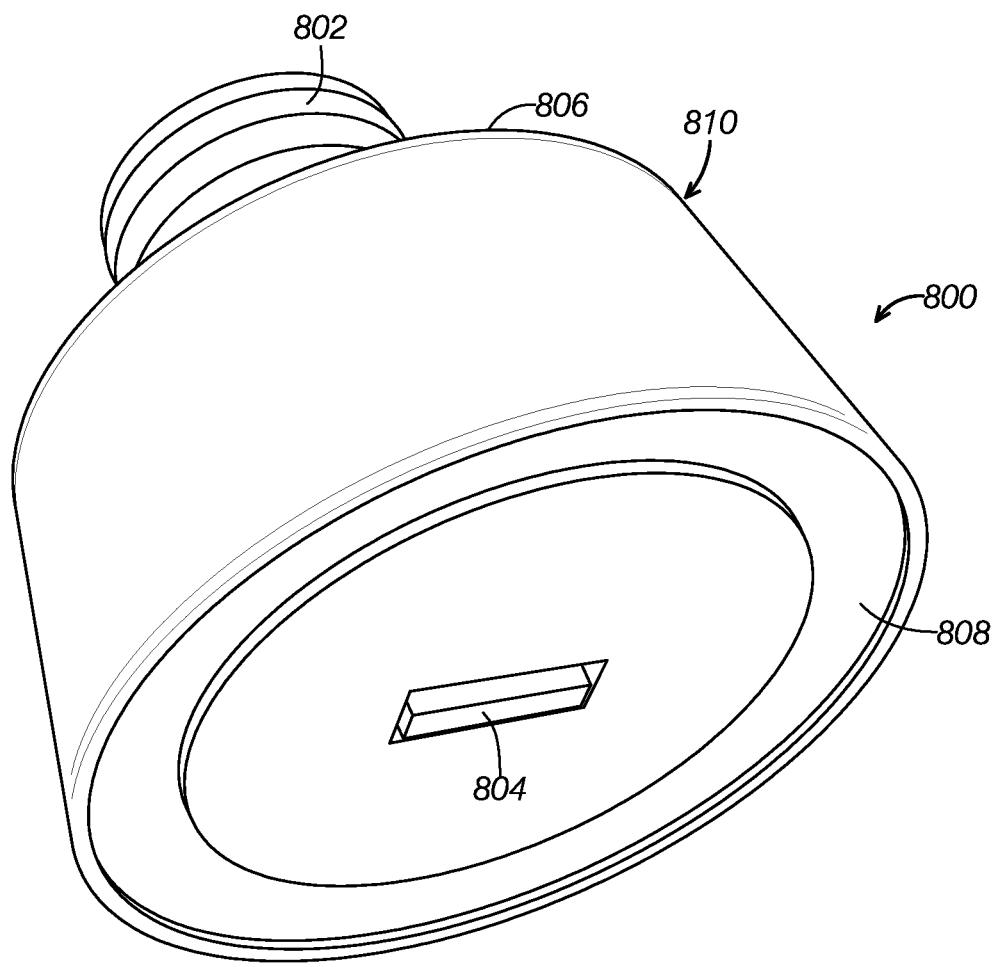
FIG. 14 is a perspective view of an illustrative socket adapter of a light control system in accordance with aspects of the present disclosure.

FIG. 14 is a perspective view of an illustrative socket adapter 800 of a light control system in accordance with aspects of the present disclosure. Socket adapter 800 includes a housing 810, a socket connector 802 and a USB port 804. Socket connector 802 is configured to match a regular light socket and is located at a top 806 of housing 810. USB port 804 is located at a bottom 808 of housing 810. It should be appreciated that USB port 804 may be positioned at any appropriate part such as a side of housing 810.

Socket adapter 800 may include an AC/DC convertor and a voltage transformer (not shown) to step down the voltage to an appropriate level for a light control device or other electronic devices. Socket adapter 800 turns a regular light socket into a USB port. When a light control device is used in a closet, socket adapter 800 is connected to a light socket on a ceiling of the closet. A USB plug is inserted into USB port 804 and a USB cord is arranged to travel along the ceiling to a door frame and then join a light strip all the way to the light control device. As long as a light switch for the light socket is on, the light control device or the light control system is powered.

Further, the use of socket adapter can create motion patterns recognized by a light controller of a light control device. For example, the light controller may be configured to recognize "switch on", "switch off" and their various combinations as the power is on or off. Thus, various light modes are possible by operating the light switch.

A barrel jack or any other type of electrical connect may be used as an alternative to the USB port for using the power from the light socket to power the light control system.

B. Illustrative Combinations and Additional Examples

This section describes additional aspects and features of light control devices, light control systems and components of light control systems, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A light control system for a LED light strip in a room, the LED light strip positioned at least partially along a perimeter of an entranceway of the room, comprising:
a light control device including:
a housing including a selector mechanism moveable relative to the housing;
an activity sensor disposed on the selector mechanism, wherein the activity sensor is configured to detect an object in a vicinity of the entranceway and is aimed toward a moving path of the object in the vicinity of the entranceway or relative to the entranceway; and
a light controller disposed in the housing and configured to control light from the light strip in response to a detected object by the activity sensor;
wherein the selector mechanism is moveable to calibrate a position of the object at which the light is activated; and
a plurality of clips to receive the light strip and adapted to attach the light strip to sides of the entranceway, wherein each of the clips is adjustable to a normal position and a tilted position, wherein the plurality of clips together orient a light beam from the light strip substantially perpendicular to a plane containing the entranceway at the normal position and orient a light ray from the light strip forming an angle with the plane.

A1. The light control system of paragraph A0, wherein the selector mechanism is a rotatable wheel and is disposed on a top of the housing and includes an indicator for the position of the object at which the light is activated for a calibration.

A2. The light control system of paragraph A0, wherein each of the plurality of clips includes a cradle piece and a sickle piece position on the cradle piece, the sickle piece is rotatable relative to the cradle piece such that the clip is adjustable to be at the normal position at which an upper surface of the cradle piece is substantially parallel to a bottom surface of the cradle piece and adjustable to be at tilted position at which the upper surface of the cradle piece forms an angle to the bottom surface of the cradle piece.

B0. A light control device for a light strip in a room with an entranceway, the light control device comprising:
a housing including a selector mechanism moveable relative to the housing;
a first activity sensor disposed on the selector mechanism and configured to detect an object in a vicinity of the entranceway; and
a light controller disposed in the housing and configured to control light from the light strip in response to the detected object;
wherein the first activity sensor is disposed on the selector mechanism and aimed toward a moving path of the object in the vicinity of the entranceway and the selector mechanism is moveable to calibrate a position of the object at which the light is activated.

B1. The light control device of paragraph B0, wherein the selector mechanism is a rotatable wheel and is disposed on a top of the housing.

B2. The light control device of paragraph B1, further comprising a passive infrared (PIR) sensor positioned on a middle portion on the top of the body, wherein the rotatable wheel includes a partial cover to conceal a portion of a field of view of the PIR sensor such that presence of the object outside the entranceway is undetectable by the PIR sensor.

B3. The light control device of paragraph B1, wherein a top surface of the rotatable wheel is inclined toward a center to form a reverse hollow frustum with an opening, a Fresnel lens of the PIR sensor at least partially protrudes from the opening and an upper surface of the Fresnel lens is positioned to be lowered than an upper edge of the rotatable wheel, wherein the partial cover extends from an arc circumference of the rotatable wheel toward the PIR sensor and partially covers the rotatable wheel, and wherein the first activity sensor is positioned on a side of the rotatable wheel corresponding the partial cover.

B4. The light control device of paragraph B0, further comprising an ambient light sensor positioned on the rotatable wheel and on a same side as the first activity sensor, wherein the light controller is further configured to control a light intensity in response to a signal from the ambient light sensor.

B5. The light control device of paragraph B0, further comprising an accelerometer adapted to be positioned on a vertical side of the entranceway, wherein the light controller is further configured to control the light in response to vibration detected by the accelerometer.

B6. The light control device of paragraph B0, wherein the object is a door pivotally connected to the entranceway, and the first activity sensor is configured to detect the position of the door and a motion of the door, the light controller is configured to determine a first motion pattern and a second motion pattern, and to control the light from the light strip at a first mode and a second mode in response to the first motion pattern and the second motion pattern, respectively; wherein the light strip is on in the first mode and the first motion pattern is an opening of the door, wherein the light strip is off in the second mode and the second motion pattern is a closing of the door.

B7. The light control device of paragraph B6, wherein the light controller is further configured to control the light at a third mode in response to a third motion pattern which is a sequence of opening, closing and reopening of the door and the light strip is on the third mode and is switched from the second mode.

B8. The light control device of paragraph B0, wherein there is no door in the entranceway, and the object is a hand or a leg of a person and the first activity sensor is a PIR sensor, the light controller is configured to determine a first motion pattern, a second motion and a third motion pattern and to control the light from the light strip at a first mode, a second mode and a third mode in response to the first motion pattern, the second motion pattern, and the third motion pattern, respectively; wherein the light strip is on in the first mode and the first motion pattern reflects an object's entering an inner space of the entranceway, wherein the light strip is off in the second mode and the second motion pattern reflects an object's retracting from the inner space; and wherein the light is on in the third mode and switched from the second mode, and the third motion pattern is a sequence of object's entering the inner space, retracting from the inner space and reentering the inner space.

B9. The light control device of paragraph B0, wherein the first activity sensor is a time of flight (ToF), a PIR sensor, a proximate sensor or a magnetic field sensor and the first activity sensor is positioned on the rotatable wheel.

B10. The light control device of paragraph B0, further comprising a stand to hold the housing, wherein the stand includes a base and a back support extending from the base at in a height direction of the housing and tabs extending at the height direction from the base, wherein the back support and one side of the housing forms a channel to receive wires of the light strip, and the housing is slidable in and out from the base.

B11. The light control device of paragraph B0, further comprising a second activity sensor held in a second housing, wherein the room is a closet closed by a first door and a second door, and the object is the first door or the second door, wherein the first activity sensor is configured to detect the position of the object in the vicinity of a first vertical portion of the entranceway, the second activity sensor is configured to detect a motion of the object in a vicinity of a second vertical portion of the entranceway and is powered by the light strip via a connection to one end of the light strip.

C0. A light control system for a LED light strip in a room, the LED light strip positioned at least partially along a perimeter of an entranceway of the room, comprising:

a light control device including:
a first housing including a selector mechanism on a top of the housing and moveable;
a first activity sensor disposed on the selector mechanism and configured to detect an object in a vicinity of the entranceway; and
a light controller disposed in the selector mechanism and configured to control light from the light strip in response to a detected object by the first activity sensor;
wherein the first activity sensor is disposed toward a moving path of the object in the vicinity of the entranceway and the selector mechanism is moveable to calibrate a position of the object at which the light is activated; and
a plurality of clips adapted to attach the light strip to sides of the entranceway, wherein each of the clips is adjustable to a normal position and a tilted position.

C1. The light control system of paragraph C0, wherein the object is a door pivotally connected to a first vertical portion of the entranceway and the first housing of the light control device is adapted to be disposed adjacent to the first vertical portion.

C2. The light control system of paragraph C0, further comprising an second housing and a second activity sensor disposed in the second housing, wherein the object is a first door or a second door slidable along a rail of the entranceway, the first housing is adapted to be disposed adjacent to a first vertical portion of the entranceway, and the second housing is adapted to be disposed adjacent to a second vertical portion opposite the first vertical portion, and wherein the second activity sensor is electrically connected to a second end of the LED light strip such that the second activity sensor is powered by the light strip when the light control device is powered on and signals from the second activity sensor is transmitted to the light controller via the light strip.

C3. The light control system of paragraph C0, wherein each of the plurality of clips includes a cradle piece and a sickle piece position on the cradle piece, the sickle piece is rotatable relative to the cradle piece such that the clip has the normal position at which an upper surface of the cradle piece is substantially parallel to a bottom surface of the cradle piece and a tilted position at which the upper surface of the cradle piece forms an angle to the bottom surface of the cradle piece, and wherein the plurality of clips together orient a light ray from the light strip substantially perpendicular to a plane containing the entranceway at the normal position and orient a light ray from the light strip forming an angle with the plane.

C4. The light control system of paragraph C0, wherein the room is a closet, and a perimeter of the LED light strip is greater than 51% of a sum of lengths of two vertical portions and a header portion of the entranceway.

C5. The light control system of paragraph C0, further comprising a connecting device for connecting the light control device with an electronic device.

C6. The light control system of paragraph C0, wherein the room is a closet or a cabinet.

D0. A light control device for a light strip in a room with an entranceway, comprising:
a first activity sensor to detect a position of an object in a vicinity of the entranceway or relative to the entranceway and
a light controller to control light from the light strip at a first mode and a second mode in response to a first motion pattern and a second motion pattern, respectively;
wherein the first motion pattern is a first movement of the object into an inner space of the entranceway and the second motion pattern is a second movement of the object towards the entranceway and the first movement and the second movement are detected by the first activity sensor.

D1. The light control device of paragraph D0, wherein a door is provided in the entranceway, and the object is the door, wherein the light is on in the first mode and the first movement is opening of the door, wherein the light is off in the second mode and the second movement is closing of the door, wherein the light controller is further configured to control the light at a third mode in response to a third motion pattern, and wherein the third motion pattern is a sequence of opening, closing and reopening of the door and the light is on at the third mode which is switched from the second mode.

D2. The light control device of paragraph D0, further comprising a housing to hold the first activity sensor and the light controller, wherein the housing includes a selector mechanism, the first activity sensor is a time of flight (ToF) sensor, positioned on the selector mechanism and aimed toward a moving path of an object, wherein the selector mechanism is moveable to calibrate a position of the object at which the light is activated.

D3. The light control device of paragraph D0, further comprising an ambient light sensor positioned on the selector mechanism and on a same side as the ToF sensor, wherein the light controller is further configured to control a light intensity in response to a signal from the ambient light sensor.

D4. The light control device of paragraph D2, further comprising a passive infrared (PIR) sensor positioned on a middle portion on the top of the housing and configured to emit infrared light upwards, wherein the rotatable wheel include a partial cover to conceal a portion of a field view of the PIR sensor such that a presence of the object outside the entranceway is undetectable by the PIR sensor.

D5. The light control device of paragraph D2, further comprising an accelerometer adapted to be positioned on a vertical side of the entranceway, wherein the light controller is configured to control the light at a third mode in response to a third motion pattern detected by the accelerometer, and wherein the third motion pattern is a knock on the vertical side or a knocking pattern on the vertical side, and wherein, at the third mode, the light is on and is switched from the second mode or at the third mode, the light is off and is switched from the first mode.

D6. The light control device of paragraph D0, wherein there is no door in the entranceway, and the object is a hand or a leg of a person and the first activity sensor is a PIR sensor, and wherein the light controller is further configured to control the light at a third mode in response to a third motion pattern which is a sequence of object's entering an inner space of the entranceway, retracting from the inner space and reentering the inner space, wherein, at the third mode, the light is on and is switched from the second mode or at the third mode, the light is off and is switched from the first mode.

D7. The light control device of paragraph D6, further comprising a housing to hold the first activity sensor and the light controller, wherein the housing includes a selector mechanism on a top, the PIR sensor is positioned on a middle portion on the top of the housing, wherein the selector mechanism includes a partial cover to conceal a portion of a field of view of the PIR sensor such that a presence of the object outside the entranceway is undetectable by the PIR sensor.

D8. The light control device of paragraph D0, wherein the strip controller is communicated with an electronic device to enable a user to control the light via a user interface and a user selection overrides the first mode and the second mode.

D9. The light control device of paragraph D0, further comprising a housing to hold the first activity sensor and the light controller, wherein the first activity sensor is a time of flight (ToF), a PIR sensor, a proximate sensor or a magnetic field sensor.

D10. The light control device of paragraph D1, further comprising a housing to hold the first activity sensor and the light controller, wherein the housing includes a removable battery pack and the removable battery pack is rechargeable.

E0. A clip for a light strip, comprising:
a cradle piece having a base and a cradle bed on the base; and
a sickle piece, wherein the sickle piece includes an upper plate to hold the light strip and a spine extending along a lengthwise direction;
wherein the spine of the sickle piece is connectable to the cradle piece at one of a plurality of positions including a normal position and a first tilted position; and
wherein the upper plate of the sickle piece forms a first angle to the base at the normal position and forms a second angle to the base at the first titled position.

E1. The clip of paragraph E0, wherein the sickle piece further includes a plurality of arms extending upward the upper plate and configured to secure the light strip on the sickle piece.

E2. The clip of paragraph E1, wherein the arms have a L-shape and are arranged along one side of the upper plate.

E3. The clip of paragraph E0 or paragraph E2, wherein the cradle bed of the cradle piece has an arc-shaped upper surface and a plurality of grooves are formed on arc-shaped upper surface, and wherein the spine of the sickle piece is configured to be snapped into the grooves.

E4. The clip of paragraph E0, wherein the sickle piece further include two side plates, wherein each of the side plate extends downward from the upper plate and the spine extends between the two side plates, wherein the plurality of grooves include a first groove corresponding to a lowest point of the segment and a second groove spaced away from the first groove, wherein the sickle piece is at the normal position when the spine is positioned in the first groove and is at the first titled position when the spine is positioned in the second groove, and wherein the first angle is zero at the normal position.

E5. The clip of paragraph E4, wherein the sickle piece includes at least one support between the two side plates, and the support is a segment of a circle and configured to rest on the arc-shaped upper surface of the cradle bed.

F0. A method to control light for a room with an entranceway, the method comprising:
detecting an interaction of an object relative to the entranceway;
recognizing a plurality of motion patterns based on the detected interaction and
controlling the light in a plurality of modes in response to the plurality of motion patterns.

F1. The method of paragraph F0, wherein the entranceway is closed by a door and the object is the door, and wherein the interaction is an opening and closing of the door, and the motion patterns includes opening the door, closing the door and a sequence of one of opening the door, closing the door, reopening the door and closing the door at a predetermined time period.

F2. The method of paragraph F0, wherein the entranceway is an opening without a door and the object is a person, and wherein the interaction is an action of entering the entranceway, exiting the entranceway or a sequence of one of entering the entranceway, exiting the entranceway, reentering the entranceway and exiting the door at a predetermined time period.

F3. The method of paragraph F0, wherein the object is a light switch, and wherein the interaction is an action of turning on the light switch, turning off the light switch or a sequence of one of turning on the light switch, turning off the light switch, turning on the light switch again and turning of the light switch again.

F4. The method of paragraph F0, wherein an accelerometer is disposed at a location adjacent to the entranceway and the interaction is knocking on an area adjacent to the entranceway, and wherein the interaction is an action of knocking on the area and the motion patterns include of one knocking, two knocking and a sequence of knocking.

G0. A light control system for a LED light strip in a room, the LED light strip positioned at least partially along a perimeter of an entranceway of the room, comprising:
a sensor module disposed on a first vertical portion of the entranceway and configured to detect a tapping on the first vertical portion by a user;
a light control device including:
a housing,
a battery pack removably installed in the housing,
a proximity sensor configured to detect a position of a door in a vicinity of the entranceway, and
a light controller disposed in the housing and in communication with the sensor module and the proximity sensor;
wherein the light control device is disposed adjacent a free side of the door when the door is closed; and
wherein the light controller is configured to control light from the light strip in response to a detected position of the door by the proximity sensor, and to control the light strip in response to a tapping pattern when the door is not detected within a preset distance from the entranceway by the proximity sensor.

G1. The light control system of paragraph G0, wherein the proximity sensor includes a Hall Effect sensor installed in the housing of the light control device and a magnet attached to the free side of the door, and wherein the position of the door is detected by a change of a magnetic field when the free side of the door moves away the entranceway and moves toward the entranceway.

G2. The light control system of paragraph G0, wherein the door is pivotally connected to a second vertical portion of the entranceway and the light control device is configured to turn on the light strip when the door is detected to move away from the second vertical portion of the entranceway and to turn off the light strip when the door is detected to move toward the second vertical portion of the entranceway.

G3. The light control system of paragraph G0, wherein the light control device is configured to turn on the light strip when the tapping pattern is tapping once on the first vertical portion by the user and to turn off the light strip when the tapping pattern is tapping twice on the first vertical portion by the user.

G4. The light control system of paragraph G3, wherein the light control device is configured to turn on the light strip at a lower brightness when the tapping pattern is tapping three times on the first vertical portion by the user.

G5. The light control system of paragraph G0, wherein the battery pack includes at least one rechargeable battery and an AC adapter for connecting the battery with a power source, and wherein the housing include an ejection button configured to remove the battery pack the housing.

G6. The light control system of paragraph G0, wherein the room is a closet, and a length of the LED light strip is greater than 51% of a sum of lengths of two vertical portions and a header portion of the entranceway.

G7. The light control system of paragraph G0, further comprising a plurality of clips to receive the light strip and adapted to attach the light strip to sides of the entranceway, wherein each of the clips is adjustable to a normal position and a tilted position, wherein the plurality of clips together orient a light beam from the light strip substantially perpendicular to a plane containing the entranceway at the normal position and orient a light ray from the light strip forming an angle with the plane.

H0. A light control system for a light strip in a room, the light strip positioned at least partially along a perimeter of an entranceway of the room, the light control system comprising:
a sensor module configured to detect a motion pattern of a user's hand relative to the entranceway;
a light control device including:
a housing,
a proximity sensor configured to detect a position of a door in a vicinity of the entranceway if the door is present at the entranceway, and
a light controller disposed in the housing and communicated with the sensor module and the proximity sensor;
wherein the light controller is configured to control the light strip in response to a detected position of the door by the proximity sensor; and control the light strip in response to the motion pattern detected by the sensor module when the door is not detected at a preset opening position or no door is present at the entranceway.

H1. The light control system of paragraph H0, wherein the door is pivotally connected to a second vertical portion opposing the first vertical portion, and the light control device is disposed adjacent to the first vertical portion and is configured to turn on the light strip when a free side of the door is detected to be spaced apart from the first vertical portion at a first predetermined distance and to turn off the light strip when the door is detected to be spaced apart from the first vertical portion at a second predetermined distance less than the first predetermined distance.

H2. The light control system of paragraph H0, wherein the sensor module includes an accelerometer and is disposed on a first vertical portion of the entranceway, and wherein the motion pattern is a tapping pattern of the user's hand on the first vertical portion.

H3. The light control system of paragraph H2, wherein the light control device is configured to turn on the light strip when the tapping pattern is tapping once on the first vertical portion by a user, turn off the light strip when the tapping pattern is tapping twice on the first vertical portion by the user, and turn on the light strip at a lower brightness when the tapping pattern is tapping three times on the first vertical portion by the user.

H4. The light control system of paragraph H0, wherein the door is slidably installed in the entranceway and the light control device is disposed to face a moving path of the door and configured to turn on the light strip when the door is detected to be spaced apart from the housing of the light control device at a first predetermined distance and turn off the light strip when the door is detected to be spaced apart from the housing a second predetermined distance and the first predetermined distance is greater than the second predetermined distance.

H5. The light control system of paragraph H0, wherein the proximity sensor is a Hall Effect sensor, and wherein the sensor module is a short-range infrared sensor, and the motion pattern is the user's hand extending into the entranceway and then extracting from the entranceway.

H6. The light control system of paragraph H0, wherein the proximity sensor is a short-range infrared sensor, and wherein the sensor module is a capacitive-touch sensor, and the motion pattern is a touching pattern of the user's hand.

H7. The light control system of paragraph H0, wherein the light control device incudes an inner space to hold a battery pack, the battery pack includes at least one rechargeable battery and an AC adapter for connecting the battery with a power source, and wherein the housing include an ejection button and the battery pack is removed from the housing upon a click on the ejection button.

I0. A method to control light from a LED light strip for a room with an entranceway, the method comprising:
  detecting a position of a door installed in the entranceway by a proximity sensor;
  controlling light from the light strip in response to a detected position of the door; and
  controlling the light from the light strip in response to a tapping pattern on an area adjacent to the entranceway detected by an accelerometer if presence of the door is not detected in a vicinity of the entranceway.

I1. The light control system of paragraph I0, wherein controlling the light from the light strip includes turning the light on when the door is detected to be at a first predetermined distance from a vertical portion of the entranceway and turning the light off when the door is detected to be at a second predetermined distance from vertical portion of the entranceway, and the first predetermined distance is greater than the second predetermined distance.

I2. The light control system of paragraph I0, wherein the tapping pattern includes tapping once on the area, tapping twice on the area and tapping three times on the area.

I3. The light control system of paragraph I0, wherein the tapping pattern is a number of taps in a predetermined time period.

Advantages, Features, and Benefits

The different embodiments and examples of the light control devices and light control systems for a room described herein provide several advantages over known solutions for better user experience. For example, illustrative embodiments and examples described herein can control the light strip automatically based on a door position and the user's hand signals. In an entranceway with a door, the light strip is controlled by opening and closing of the door. When the door remains at an open position, the user's hand signal controls the light strip. In this way, the light strip can be controlled seamlessly between a control mode of the light activation/deactivation in response to a door position and a control mode of the light activation/deactivation in response to the user's hand signal. Further, the light control system can be used in an entranceway without a door and the light strip is simply controlled in response to a user's hand signal because a door cannot be detected in the entranceway.

Additionally, illustrative embodiments and examples described herein allow the user to calibrate the time of turning on or turning off the light from a light strip. Thus, the light control devices and system are user friendly.

Additionally, and among other benefits, illustrative embodiments and examples described herein are versatile and allow for use in different settings such as a closet with a door or without door. Further, illustrative embodiments and examples may be used in any inner space having an entranceway such as a closet, a storage room, a cabinet, or essentially any space where it is desirable to provide and/or control the lighting based on motions at the entranceway, such as motions of a door disposed in the entranceway.

Additionally, and among other benefits, illustrative embodiments and examples described herein allow one activity sensor at one location is powered by a LED light strip and electronically communicated with a light control device at another location via the LED light strip such that the wiring and/or data line can be simplified.

Additionally, and among other benefits, illustrative embodiments and examples described herein allow a user to calibrate and adjust a field of view of a PIR sensor of the light control device. In this way, one configuration of a Fresnel lens of the PIR sensor can be used in various applications while satisfying the user's preference.

Additionally, and among other benefits, illustrative embodiments and examples described herein incorporate a removeable battery pack in a housing the light control device. The battery pack is rechargeable and can be used as a primary power source and/or a supplement power source. Thus, a power is always available for the light control devices and systems.

Additionally, and among other benefits, illustrative embodiments and examples described herein allow simple light control by motion patterns of an object adjacent an entranceway of a room.

Additionally, and among other benefits, illustrative embodiments and examples described herein allow an integration of the light control devices and systems with an existing home automation system.

Additionally, and among other benefits, illustrative embodiments and examples described herein allow adjustment an angle of light beam from a light strip and the desired light beam direction can be set up by a user using the clips.

No known system or device can perform these functions. However, not all embodiments and examples described herein provide the same advantages or the same degree of advantage.

Conclusion

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A light control system for a light strip, comprising:
an LED light strip configured to extend around at least a portion of a perimeter of an entranceway to a room; and
a light control device including:
a housing, an infrared sensor configured to detect objects in a vicinity of the entranceway, based at least in part on temperature,
a cover configured to selectively obstruct a portion of a field of view of the infrared sensor such that the objects are undetectable by the infrared sensor when positioned in the obstructed portion of the field of view of the infrared sensor,
a light controller disposed in the housing and in communication with the infrared sensor, and
a battery pack removably installed in the housing and including a rechargeable battery;
wherein the light controller is configured to control the light strip in response to detection by the infrared sensor of a gesture made by a hand of a user.

2. The light control system of claim 1, wherein a length of the LED light strip is greater than 51% of a sum of lengths of two vertical portions and a top horizontal header portion of the perimeter of the entranceway.

3. The light control system of claim 1, wherein the battery is charged when the light control device is connected to a power outlet.

4. The light control system of claim 1, wherein the light control device can be powered by being plugged into a power source, or can be powered by the battery pack when the light control device is not plugged into a power source.

5. The light control system of claim 1, wherein the battery pack may be used as a sole power source for the light control device, or as a supplemental power source for the light control device.

6. The light control system of claim 1, wherein the battery pack includes an AC adapter, and the housing includes space to contain the battery and the AC adapter.

7. The light control system of claim 1, wherein the gesture includes an insertion of the hand into the entranceway and a subsequent retraction of the hand from the entranceway.

8. A light control system, comprising:
an LED light strip configured to be disposed along a majority of a perimeter of a frame enclosing an entranceway of a room; and
a light control device including:
an activity sensor configured to detect infrared radiation characteristic of a human-body-temperature object in a vicinity of the entranceway,
a cover configured to selectively obstruct a portion of a field of view of the activity sensor, such that the human-body-temperature object is undetectable by the activity sensor when in the obstructed portion of the field of view,
a light controller in communication with the activity sensor, and
a rechargeable battery configured to power the light controller when the light controller is not powered by an AC power source;
wherein the light controller is configured to control the light strip in response to a detection by the activity sensor of a predetermined motion pattern of the human-body-temperature object.

9. The light control system of claim 8, wherein a length of the LED light strip is greater than 75% of a sum of lengths of two vertical portions and a top horizontal header portion of the perimeter of the entranceway.

10. The light control system of claim 8, wherein the battery is charged when the light control device is connected to an AC power outlet.

11. The light control system of claim 8, wherein the light controller and the battery are disposed in a housing and the battery is removable from the housing.

12. The light control system of claim 11, further comprising an AC adapter disposed in the housing.

13. The light control system of claim 8, wherein the battery may be used as a sole power source for the light control device, or as a supplemental power source for the light control device.

14. The light control system of claim 8, wherein the predetermined motion pattern of the human-body-temperature object includes insertion and retraction of the object through the entranceway during a same predetermined time period.

15. A light control system, comprising:
an LED light strip; and
a light control device including:
an activity sensor configured to detect a hand gesture in a vicinity of an entranceway,
a cover configured to selectively obstruct a portion of a field of view of the activity sensor such that the cover blocks detection of the gesture when the gesture is made in the obstructed portion of the field of view of the activity sensor,
a light controller in communication with the activity sensor, and
a rechargeable battery pack configured to power the light controller when the light controller is not powered by an AC power source;
wherein the light controller is configured to control the LED light strip in response to the detected gesture; and
wherein the activity sensor is configured to detect the gesture based at least in part on a temperature of the hand.

16. The light control system of claim 15, wherein the battery pack is charged automatically when the light control device is connected to an AC power source.

17. The light control system of claim 15, wherein the light controller and the battery pack are disposed in a housing, and the battery pack is removable from the housing.

18. The light control system of claim 17, further comprising an AC adapter disposed in the housing.

19. The light control system of claim 15, wherein the battery pack may be used as a sole power source for the light control device, or as a supplemental power source for the light control device.

* * * * *

UNITED STATES PATENT AND TRADEMARK OFFICE
CERTIFICATE OF CORRECTION

PATENT NO.       : 11,284,496 B2
APPLICATION NO.  : 17/177104
DATED            : March 22, 2022
INVENTOR(S)      : Christopher Stubbs It is certified that error appears in the above-identified patent and that said Letters Patent is hereby corrected as shown below:

In the Claims

Column 29, Lines 53-54, Claim 8: the text "such that the human-body-temperature obiect" should read --such that the human-body-temperature object--.

Signed and Sealed this
Thirty-first Day of May, 2022

Katherine Kelly Vidal
*Director of the United States Patent and Trademark Office*